United States Patent
Ferringer et al.

(10) Patent No.: US 8,560,472 B2
(45) Date of Patent: Oct. 15, 2013

(54) SYSTEMS AND METHODS FOR SUPPORTING RESTRICTED SEARCH IN HIGH-DIMENSIONAL SPACES

(75) Inventors: Matthew Phillip Ferringer, Round Hill, VA (US); Timothy Guy Thompson, Purcellville, VA (US); Ronald Scott Clifton, Leesburg, VA (US); Marc David DiPrinzio, South Riding, VA (US)

(73) Assignee: The Aerospace Corporation, El Segundo, CA (US)

( * ) Notice: Subject to any disclaimer, the term of this patent is extended or adjusted under 35 U.S.C. 154(b) by 490 days.

(21) Appl. No.: 12/895,310

(22) Filed: Sep. 30, 2010

(65) Prior Publication Data

US 2012/0084314 A1    Apr. 5, 2012

(51) Int. Cl.
*G06N 3/12* (2006.01)

(52) U.S. Cl.
CPC ..................... *G06N 3/126* (2013.01)
USPC .......................................................... 706/13

(58) Field of Classification Search
None
See application file for complete search history.

(56) References Cited

U.S. PATENT DOCUMENTS

| | | | |
|---|---|---|---|
| 5,568,590 A | 10/1996 | Tolson | |
| 6,532,076 B1 | 3/2003 | Sidorowich | |
| 7,996,344 B1 | 8/2011 | Goel | |
| 8,069,127 B2 | 11/2011 | Taylor et al. | |
| 8,255,344 B2 | 8/2012 | Ferringer et al. | |
| 8,255,345 B2 | 8/2012 | Ferringer et al. | |
| 8,285,653 B2 | 10/2012 | Ferringer et al. | |
| 2008/0010044 A1 | 1/2008 | Ruetsch | |
| 2010/0292929 A1 | 11/2010 | Ferringer et al. | |
| 2010/0293120 A1 | 11/2010 | Ferringer et al. | |
| 2010/0293122 A1 | 11/2010 | Ferringer et al. | |
| 2010/0293313 A1 | 11/2010 | Ferringer et al. | |
| 2011/0078100 A1 | 3/2011 | Goel | |

OTHER PUBLICATIONS

Horn, Jeffrey et al.; "A Niched Pareto Genetic Algorithm for Multiobjective Optimization"; 1994; IEEE; pp. 82-87.*
Van Veldhuizen, David A. et al.; "Multiobjective Evolutionary Algorithm Research: A History and Analysis";1998; TR-98-03; Department of Electrical and Computer Engineering Graduate School of Engineering; Air Force Institute of Technology; Wright Patterson AFB, OH; pp. 1-9 and 21-30.*
Erickson, Mark et al.; "Multi-objective optimal design of groundwater remediation systems: application of the niched Pareto genetic algorithm (NPGA)"; 2002; Elsevier Science Ltd.; Advances in Water Resources 25 (2002); pp. 51-65.*
Benedict, Shajulin et al.; "Scheduling of scientific workflows using Niched Pareto GA for Grids"; 2006; IEEE; pp. 908-912.*

(Continued)

*Primary Examiner* — Jeffrey A Gaffin
*Assistant Examiner* — Stanley K Hill
(74) *Attorney, Agent, or Firm* — Sutherland Asbill & Brennan LLP

(57) ABSTRACT

Embodiments of the invention may provide systems and methods for supporting restricted search capabilities in high-dimensional spaces. These example restricted search capabilities may allow for an unbiased search that is simply restricted to those regions of interest to a decision maker. It will be appreciated that a restricted search does not mean that additional constraints, such as preference or biasing information, are utilized to reduce the search space into some feasible sub-space of the original optimization problem. Instead, the example restricted search may limit the search to a certain sub-space of the full multi-dimensional tradeoff space.

20 Claims, 18 Drawing Sheets

(56) References Cited

OTHER PUBLICATIONS

Matthew P. Ferringer et al., "Efficient and Accurate Evolutionary Multi-Objective Optimization Paradigms for Satellite Constellation Design." Journal of Spacecraft and Rockets. vol. 44, No. 3, May-Jun. 2007. 682-691.
Patrick M. Reed et al., "Parallel Evolutionary Multi-Objective Optimization on Large, Heterogeneous Clusters: An Applications Perspective." Journal of Aerospace Computing, Information, and Communication. vol. 5, Nov. 2008. 460-478.
J.B. Kollat et al., "A Computational Scaling Analysis of Multiobjective Evolutionary Algorithms in Long-Term Groundwater Monitoring Applications." Advances in Water Resources. Jan. 25, 2006. 1-24.
Y. Tang et al., "Parallelization Strategies for Rapid and Robust Evolutionary Multiobjective Optimization in Water Resources Applications." Advances in Water Resources. Mar. 29, 2006. 1-39.
J.B. Kollat et al., "Comparing state-of-the-art evolutionary multi-objective algorithms for long-term groundwater monitoring design." Advances in Water Resources 29 (2006): 792-807. <www.elsevier.com/locate/advwatres>.
Kalyanmoy Deb et al., "Evaluating the epsilon-Domination Based Multi-Objective Evolutionary Algorithm for a Quick Computation of Pareto-Optimal Solutions." Evolutionary Computation (13)4: 501-525, 2005.
Joshua B. Kollat et al., "The Value of Online Adaptive Search: A Performance Comparison of NSGAII, epsilon-NSGAII and epsilonMOEA." Springer-Verlag Berlin Heidelberg 2005. 386-398.
Kalyanmoy Deb et al., "A Fast and Elitist Multi-Objective Genetic Algorithm: NSGA-II" KanGAL Report No. 200001. 20 pages, 2002.
Matthew P. Ferringer et al., "Many-objective Reconfiguration of Operational Satellite Constellations with the Large-Cluster Epsilon Non-domination Sorting Genetic Algorithm-II." The Aerospace Corporation's Independent Research and Development Program. Oct. 31, 2008. 10 pages.
David A. Van Veldhuizen et al., "Considerations in Engineering Parallel Multiobjective Evolutionary Algorithms." IEEE Transactions on Evolutionary Computation. vol. 7, No. 2, Apr. 2003. 144-173.
Matthew P. Ferringer et al., "Satellite Constellation Design Tradeoffs Using Multiple-Objective Evolutionary Computation." Journal of Spacecraft and Rockets. vol. 43, No. 6, Nov.-Dec. 2006. 1404-1411.
Search Report and Written Opinion for International Application No. PCT/US2010/034955 mailed Aug. 17, 2010.
Matthew P. Ferringer, "General Framework for the Reconfiguration of Satellite Constellations." <http://etda.libraries.psu.edu/theses/approved/WorldWideIndex/ETD-3537/index.html>, 40 pages, Aug. 2009.
Matthew P. Ferringer et al., "Pareto-hypervolumes for the Reconfiguration of Satellite Constellations." AIAA/AAS Astrodynamics Specialist Conference and Exhibit. Aug. 18-21, 2008, p. 1-31.
Yong Tang, "Advancing Hydrologic Model Evaluation and Identification Using Multiobjective Calibration Sensitivity Analysis and Parallel Computation." ProQuest Information and Learning Company. 2007, 48 pages.
Scott Zimmer et al., "Utilizing Evolutionary Algorithms for Problems with Vast Infeasible Regions and Expensive Function Evaluations." The Aerospace Corporation. Jun. 27, 2008, 12 pages.
Theodore R. Stodgell et al., "Satellite Rendezvous Tours Using Multiobjective Evolutionary Optimization." The Pennsylvania State University. 28 pages, 2008.
Joshua B. Kollat et al., "A Framework for Visually Interactive Decision-making and Design using Evolutionary Multi-objective Optimization (VIDEO)" Environmental Modelling & Software 22. 2007, 1691-1704.
Joshua B. Kollat et al., "A New Epsilon-Dominance Hierarchical Bayesian Optimization Algorithm for Large Multiobjective Monitoring Network Design Problems" Advances in Water Resources 31. 2008, 828-845.
Allison Barker, "Aerospace Competes in International Global Trajectory Optimization Competition." Orbiter. vol. 48, No. 3. Mar. 27, 2008, 1 page.
Anonymous, <http://www.apptimation.com/Technology/Technology.html>, 1 page.
Muhlenbein, Heinz et al.; "Evolution in time and space—the parallel genetic algorithm."; 1991; Morgan Kaufmann; pp. 1-22.
Cantu-Paz, Erick et al.; "Efficient parallel genetic algorithms: theory and practice." 2000; Comput. Methods Appl. Mech. Engrg. 186 (2000) pp. 221-238; Elsevier Science S.A.
Laumanns, Marco et al.; "Combining Convergence and Diversity in Evolutionary Multi-Objective Optimization"; 2002; Massachusetts Institute of Technology; Evolutionary Computation 10(3); pp. 1-21.
Deb, Kalyanmoy et al.; "Omni-Optimizer: A generic evolutionary algorithm for single and multi-objective optimization"; 2006; Elsevier; European Journal of Operational Research 185 (2008); pp. 1062-1087.
Ventura, Sebastian et al.; "JCLEC: a Java framework for evolutionary computation"; 2007; Springer-Verlag; pp. 381-392.
Chuang, Angela S. et al.; "An Extensible Genetic Algorithm Framework for Problem Solving in a Common Environment"; 2000; IEEE; Transactions on Power Systems, vol. 15, No. 1; pp. 269-275.
Tan, K. C. et al.; "A Multiobjective Evolutionary Algorithm Toolbox for Computer-Aided Multiobjective Optimization"; 2001; IEEE; Transactions on Systems, Man, and Cybernetics—Part B: Cybernetics, vol. 31, No. 4; pp. 537-556.
Co-pending U.S. Appl. No. 13/799,819, filed Mar. 13, 2013.
Co-pending U.S. Appl. No. 13/837,782, filed Mar. 15, 2013.

* cited by examiner

SYSTEMS AND METHODS FOR SUPPORTING RESTRICTED SEARCH IN HIGH-DIMENSIONAL SPACES

FIELD OF THE INVENTION

Aspects of the invention relate generally to evolutionary algorithms and other genetic resources, and more particularly to systems and methods for supporting restricted search in high-dimensional spaces.

BACKGROUND OF THE INVENTION

Multi-criteria decision making tools suffer from scalability problems as the number of objectives grows. Prior art suggests methods to tackle this problem that require a priori preference or biasing information to be introduced before an optimization is performed. However, the use of a priori preference or biasing information results in sustained favoring of certain objectives leading the search to miss solutions that may have been desired over the final result. Accordingly, there is an opportunity in the industry for systems and methods for supporting restricted search in high-dimensional spaces.

SUMMARY OF THE INVENTION

According to an example embodiment of the invention, there is a method. The method may include determining a plurality of sub-dimensional subsets, wherein the plurality of sub-dimensional subsets collectively define a restricted search space for an unbiased optimization of a plurality of variables in accordance with a plurality of objectives, wherein the restricted search space is only a portion of a total search space defined from the plurality of objectives; and receiving a pair of chromosome data structures, wherein each parent chromosome data structure provides a plurality of genes representative of the plurality of variables, wherein each of the plurality of variables are permitted to evolve in value. For each subset of the plurality of sub-dimensional subsets, the method may further include: selecting the respective subset for competition; determining a subset-winning chromosome data structure from the pair of chromosome data structures by considering at least one of (i) respective domination characteristics for respective ones of the pair of chromosome data structures based upon a competition between the pair of chromosome data structures, or (ii) respective diversity characteristics associated with respective ones of the pair of chromosome data structures; accumulating a unit of measure for the subset-winning chromosome data structure, wherein an amount accumulated for the unit of measure varies depending upon a respective subset ranking previously assigned to the subset-winning chromosome data structure, the respective subset ranking determined by performing domination sorting, restricted to the selected subset, for an entire population of chromosome data structures that included the subset-winning chromosome data structure; and determining an overall winning chromosome data structure of the pair of chromosome data structures by at least comparing the respective accumulated unit of measure for each of the pair of chromosome data structures. One or more of the prior steps may be performed by one or more computers. The one or more computers may include software, hardware, or a combination thereof to perform the foregoing steps.

According to an example embodiment of the invention, there is a system. The system may include at least one memory that stores computer-executable instructions, and at least one processor configured to access the memory. The at least one processor may be further configured to execute the computer-executable instructions to: determine a plurality of sub-dimensional subsets, wherein the plurality of sub-dimensional subsets collectively define a restricted search space for an unbiased optimization of a plurality of variables in accordance with a plurality of objectives, wherein the restricted search space is only a portion of a total search space defined from the plurality of objectives; receive a pair of chromosome data structures, wherein each parent chromosome data structure provides a plurality of genes representative of the plurality of variables, wherein each of the plurality of variables are permitted to evolve in value; and for each subset of the plurality of sub-dimensional subsets: select the respective subset for competition; determine a subset-winning chromosome data structure from the pair of chromosome data structures by considering at least one of (i) respective domination characteristics for respective ones of the pair of chromosome data structures based upon a competition between the pair of chromosome data structures, or (ii) respective diversity characteristics associated with respective ones of the pair of chromosome data structures; accumulate a unit of measure for the subset-winning chromosome data structure, wherein an amount accumulated for the unit of measure varies depending upon a respective subset ranking previously assigned to the subset-winning chromosome data structure, the respective subset ranking determined by performing domination sorting, restricted to the selected subset, for an entire population of chromosome data structures that included the subset-winning chromosome data structure; and determine an overall winning chromosome data structure of the pair of chromosome data structures by at least comparing the respective accumulated unit of measure for each of the pair of chromosome data structures.

BRIEF DESCRIPTION OF THE DRAWINGS

Reference will now be made to the accompanying drawings, which are not necessarily drawn to scale, and wherein.

DETAILED DESCRIPTION

Embodiments of the invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments of the invention may provide systems and methods for supporting restricted search capabilities in high-dimensional spaces. In an example embodiment of the invention, example restricted search capabilities may allow for an unbiased search that is simply restricted to those regions of interest to a decision maker. Example non-domination sorting and selection algorithms described herein may be utilized to drive solutions towards convergence in the regions of interest.

It will be appreciated that a restricted search does not mean that additional constraints, such as preference or biasing information, are utilized to reduce the search space into some feasible sub-space of the original optimization problem. Instead, the example restricted search, as described herein, simply limits the search to a certain sub-space of the full multi-dimensional trade-off space. For example, according to an example embodiment, a multi-dimensional space for an optimization problem may be collectively defined by a plurality of sub-dimensional subsets. However, an example restricted search as described herein may limit the search to only a selected portion of the plurality of sub-dimensional subsets. In this way, an example restricted search may provide at least one of (i) enabling a rapid search-to-convergence or (ii) making what was previously computationally intractable, possible.

I. Core Management System

Figure 1A:
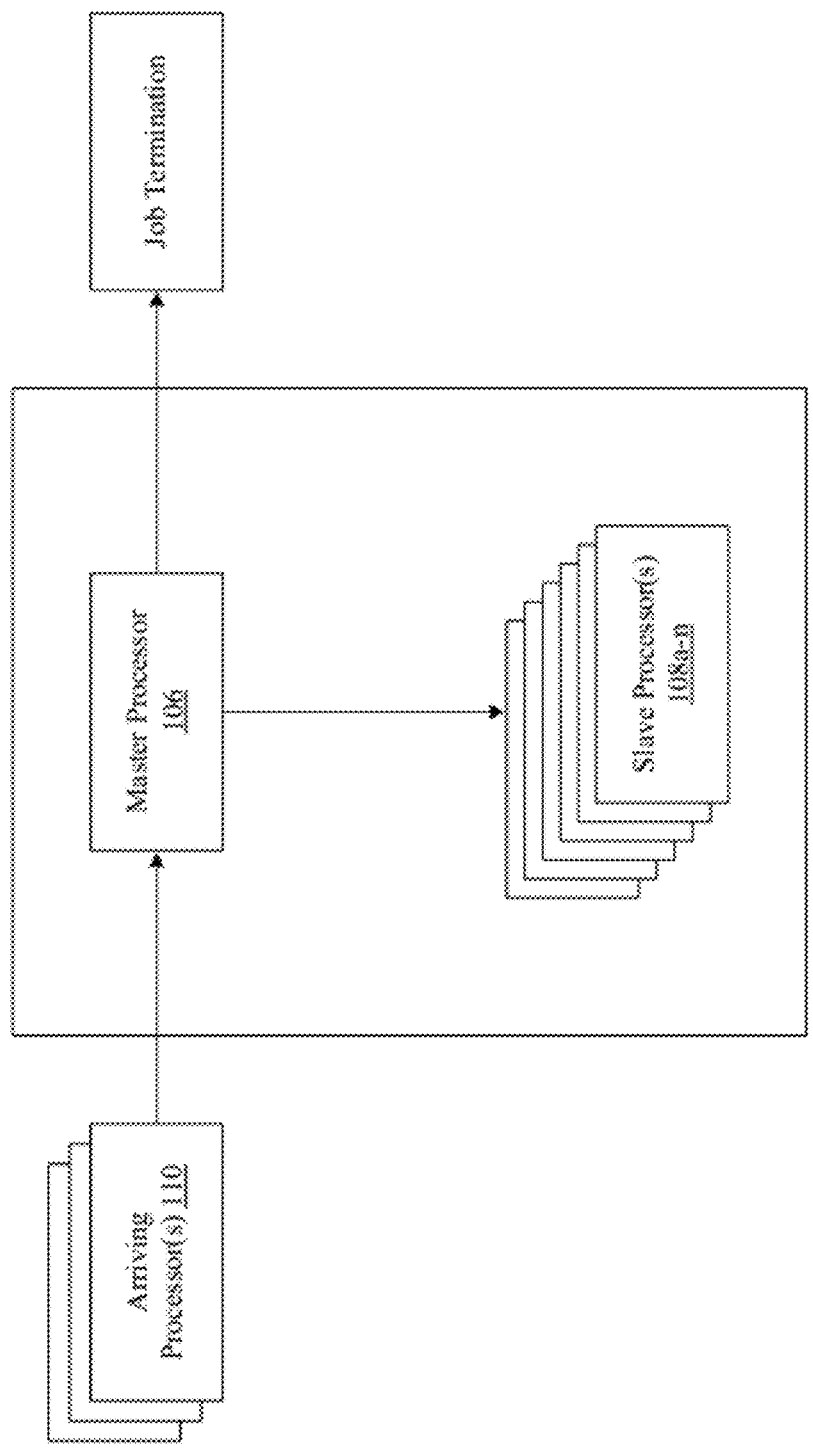
FIG. 1A illustrates an example core management system that supports parallel processing utilized for one or more evolutionary algorithms associated with restricted search in multi-objective optimization, as described herein, according to an example embodiment of the invention.

FIG. 1A illustrates an example core management system 100 that supports parallel processing utilized for one or more evolutionary algorithms associated with a restricted search in a multi-objective optimization, as described herein, according to an example embodiment of the invention. As shown in FIG. 1A, there may be a processing environment 120 in which processing associated with one or more evolutionary algorithms is managed and performed. The processing environment may include one or more master processor computers 106 (also referred to as "master processors"), and slave processor computers 108a-n (also referred to as "slave processors").

The master processor 106 may be operative to dynamically configure and reconfigure the processing environment 120. In general, the master processor 106 may make a dynamic determination of how many slave processors 108a-n are needed for a job, as well as when job termination criteria have been satisfied, as will be discussed in further detail herein.

During initial set-up or configuration of the processing environment 120, the master processor 106 may identify a number of available arriving processor(s) 110 having processing capacity. These arriving processor(s) 110 may be available for utilization, perhaps as a result of another application processing being completed. The master processor 106 may also configure and assign one or more of the arriving processor(s) 110 as the respective one or more slave processors 108a-n of the master processor 106. The slave processors 108a-n may likewise carry out one or more operations as instructed by the master processor 106.

Subsequent to the initial set-up or configuration, the master processor 106 may also be operative to dynamically reconfigure the processing environment 120. As an example of such reconfiguration, additional arriving processor(s) 110 may be identified by the master processor 106 as being available while the processing environment 120 is in operation. Accordingly, the manager processor 104 may assign roles to the additional arriving processor(s) 110 as needed. For example, one or more slave processor(s) 108a-n in the processing environment 120 may become exhausted (e.g., allocated processing time has been reached), and may need to be removed from the processing environment 120. The departing slave processor(s) 108a-n may have experienced a processing failure or may have otherwise been requested by a higher priority application.

As introduced above, the master processor 106 may determine the number of slave processor(s) 108a-n needed, according to an example embodiment of the invention. In an example embodiment of the invention, a goal of a master processor 106 may be to keep the associated slave processors 108a-n fed with work as efficiently as possible. When a slave processor 108a-n requests work from the master processor 106 (e.g., sends a packet with results from evaluating the previously received chromosome data structure), the master processor 106 is most efficient in responding to the slave processor 108a-n when it is waiting for the packet (e.g., the master processor 106 is not busy doing other things).

It will be appreciated that the processing environment 120 described herein may accommodate various numbers of processors without departing from example embodiments of the invention.

Figure 1B:
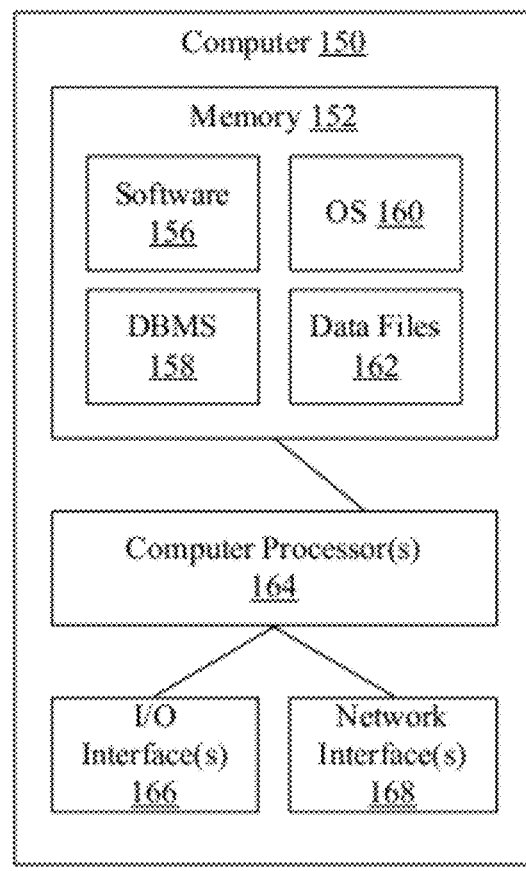
FIG. 1B illustrates an example computer for implementing one or more of the processors in FIG. 1A, according to an example embodiment of the invention.

The processors described in FIG. 1A, including the master processor 106, the slave processors(s) 108a-n, and the arriving processor(s) 110, may be implemented using computers substantially similar to computer 150, or a variation thereof, illustrated in FIG. 1B. The computer 150 may be any processor-driven device, such as, but not limited to, a personal computer, laptop computer, server computer, cluster computer, a specialized computer, and the like. In addition to having one or more computer processor(s) 164, the computer 150 may further include at least one memory 152, input/output ("I/O") interface(s) 166, and network interface(s) 168. The memory 152 may be any computer-readable medium, coupled to the computer processor(s) 164, such as RAM, ROM, and/or a removable storage device for storing data files 162 and a database management system ("DBMS") 158 to facilitate management of data files 162 and other data stored in the memory 152 and/or stored in separate databases. The memory 152 may also store various program modules, such as an operating system ("OS") 160 and software 156. The software 156 may comprise one or more software programs for managing, configuring, or performing one or more operations of an evolutionary algorithm, according to an example embodiment of the invention.

The I/O interface(s) 166 may facilitate communication between the computer processor(s) 164 and various I/O devices, such as a keyboard, mouse, printer, microphone, speaker, monitor, bar code readers/scanners, RFID readers, and the like. Likewise, the network interface(s) described herein may take any of a number of forms, such as a network interface card, a modem, a wireless network card, and the like.

Numerous other operating environments, system architectures, and device configurations are possible, beyond those illustrated in FIGS. 1A and 1B. Other system embodiments can include fewer or greater numbers of components and may incorporate some or all of the functionality described with respect to FIGS. 1A and 1B. Accordingly, embodiments of the invention should not be construed as being limited to any particular operating environment, system architecture, or device configuration.

II. Parallel Processing Optimization

A. System Overview

Figure 2:
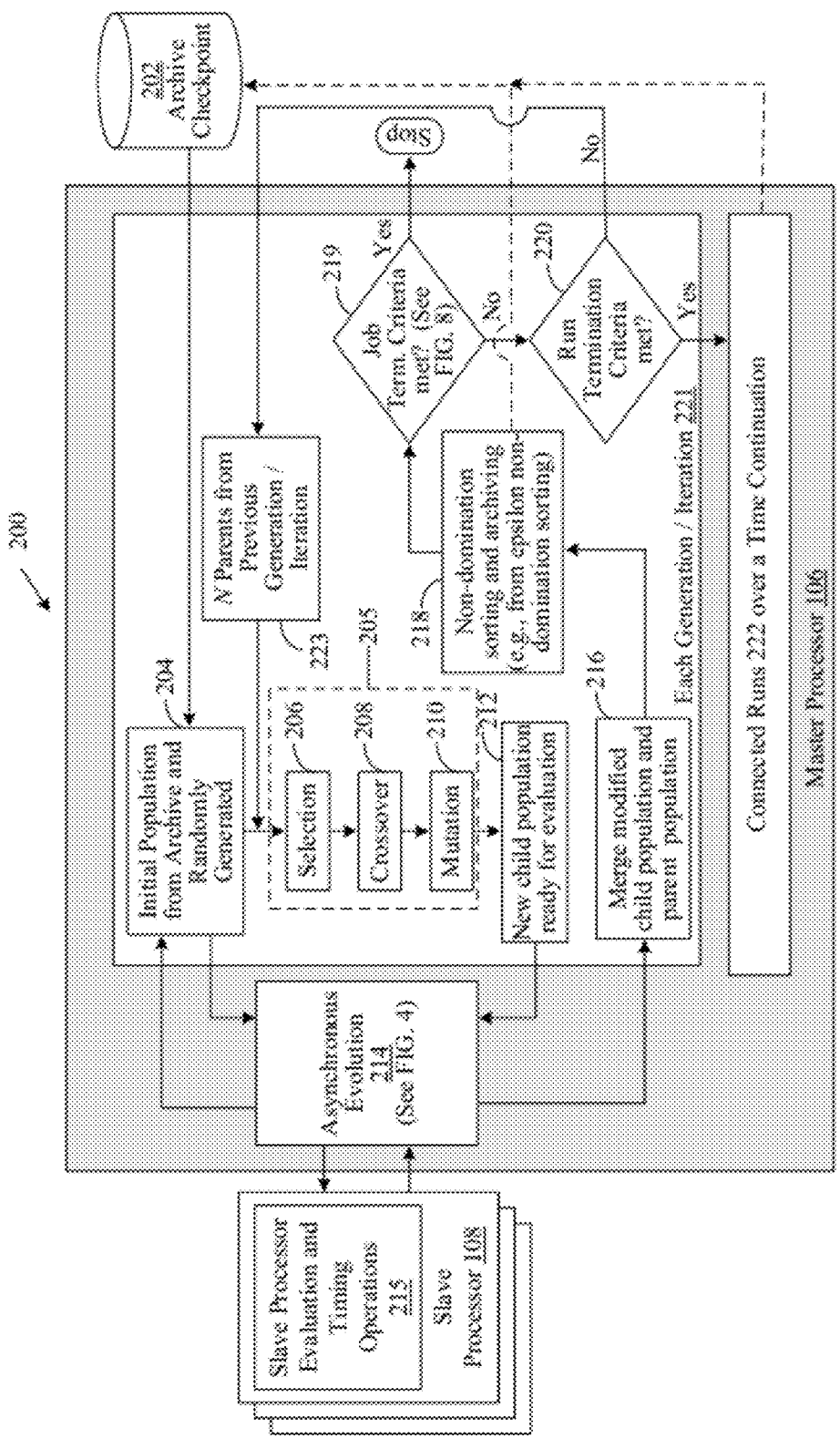
FIG. 2 illustrates an example parallel processing system that executes an evolutionary algorithm supporting restricted search capabilities, according to an example embodiment of the invention.

FIG. 2 illustrates an example parallel processing system 200 that executes an evolutionary algorithm supporting restricted search capabilities, according to an example embodiment of the invention. As shown in FIG. 2, a first portion of the evolutionary algorithm may be performed by a master processor 106 while a second portion of the evolutionary algorithm may be performed by one or more slave processors 108, as discussed herein.

In an example embodiment of the invention, an executed job of the evolutionary algorithm may comprise a plurality of connected runs 222 that occur in a sequence to form a time continuation. Each run 222 may comprise one or more evolutionary operations performed during one or more generations/iterations 221. It will be appreciated that a run may be connected to a prior run in that at least some of the same parents are shared in the "initial population" utilized for initiating respective runs, according to an example embodiment of the invention.

According to an example embodiment of the invention, certain references may be made herein with respect to a plurality of declared sub-dimensional subsets. In general, the declared subsets collectively define a restricted search space for an unbiased optimization involving a plurality of variables and a plurality of objectives, where each objective may involve one or more of the plurality of variables, according to an example embodiment of the invention. This restricted search space is restricted because it is only a portion of a total search space associated with a plurality of objectives. Stated differently, a plurality of objectives define a total search space that involves a total number of sub-dimensional subsets, where each sub-dimensional subset involves relationships between or among two or more respective objectives. The "declared" subsets described herein represent only a portion of the total number of sub-dimensional subsets. As such, the declared subsets define only a restricted search space that is only a portion of the total search space, according to an example embodiment of the invention.

Example processing by an executed job of the evolutionary algorithm will now be discussed in further detail with respect to FIG. 2. Referring now to block 204, the master processor 106 may receive or obtain an initial population of parent chromosome data structures. In an example embodiment of the invention, each parent chromosome data structure may include the chromosome, where the chromosome may include one or more parameters (which may also be referred to as "genes"), which may include:

Static (Fixed Value/Constant) Variables: Once assigned, the values of the static variables remain constant and are not changed by any evolutionary operations of an evolutionary algorithm;

Evolved Variables: The values of the evolved variables may be changed by one or more evolutionary operations of an evolutionary algorithm; and Derived Variables: The values of the derived variables are derived based upon a combination of one or more static variables, evolved variables, and other derived variables in accordance with one or more functions.

Still referring to block 204, the initial population of parent chromosome data structures may be obtained by one or more sources. In an example embodiment of the invention, the initial population of parent chromosome data structures may be obtained from a combination of the archive checkpoint 202 and random generation of new chromosome data structures. For example, 25% of the initial population of parent chromosome data structures may be obtained from the archive checkpoint 202 while 75% of the initial population may be randomly generated. The chromosomes obtained from the archive checkpoint 202 may have previously been evaluated in accordance with the objective functions. On the other hand, the randomly generated chromosomes may not have been evaluated in accordance with the objective functions, and thus, they may be delivered to block 214, which allocates the chromosomes to the slave processors 108 for objective function evaluation by block 215.

The archive checkpoint 202 may include an elite set of chromosome data structures (i.e., elite solutions) obtained from one or more prior generations/iterations 221, according to an example embodiment of the invention. The archive checkpoint 202 may take the form of a data file or database stored in a computer memory, computer disk, network storage, or other non-volatile memory. As the archived chromosome data structures were previously evaluated in a prior generation/iteration 221, these chromosome data structures may be associated with a plurality of objective function values corresponding to a respective plurality of objective functions. Each objective function may be associated with any predefined objective to be optimized by the executed job of the evolutionary algorithm. For example, in a satellite constellation coverage optimization, an objective function may be associated with the objective of maximizing global coverage, and a corresponding objective function value may indicate which chromosome data structure (based upon the included chromosome and its respective genes) is able to achieve the greatest amount of global coverage.

Alternatively, in block 204, the initial population of parent chromosome data structures may be produced from only randomly generated chromosomes. In generating the random chromosome data structures, the values for the evolved and/or static variables (e.g., fixed values/constants) in the one or more chromosomes may be selected to be within specified allowable ranges or limits. Values for the derived variables can be calculated from one or more evolved variables, static variables, and/or other derived variables in accordance with one or more specified functions. The randomly generated parent chromosome data structures may then be delivered to block 214, which allocates the chromosomes to the slave processors 108 for objective function evaluation by block 215. Once the objective function evaluations in block 215 have been completed, and the objective function values have been received in block 214, then each of the randomly generated parent chromosome data structures may be associated with a respective plurality of objective function values.

It will be appreciated that each member of the population of chromosome data structures may have an associated rank array equal and/or diversity array equal in dimension to the total number of declared subsets for optimization over the subspace. The rank array and/or diversity array may have been previously filled, in accordance with block 218 discussed herein, for each chromosome data structure by computing its domination rank for each subset. This rank array and/or diversity array may be utilized as part of the selection process in block 206.

Figure 3A:
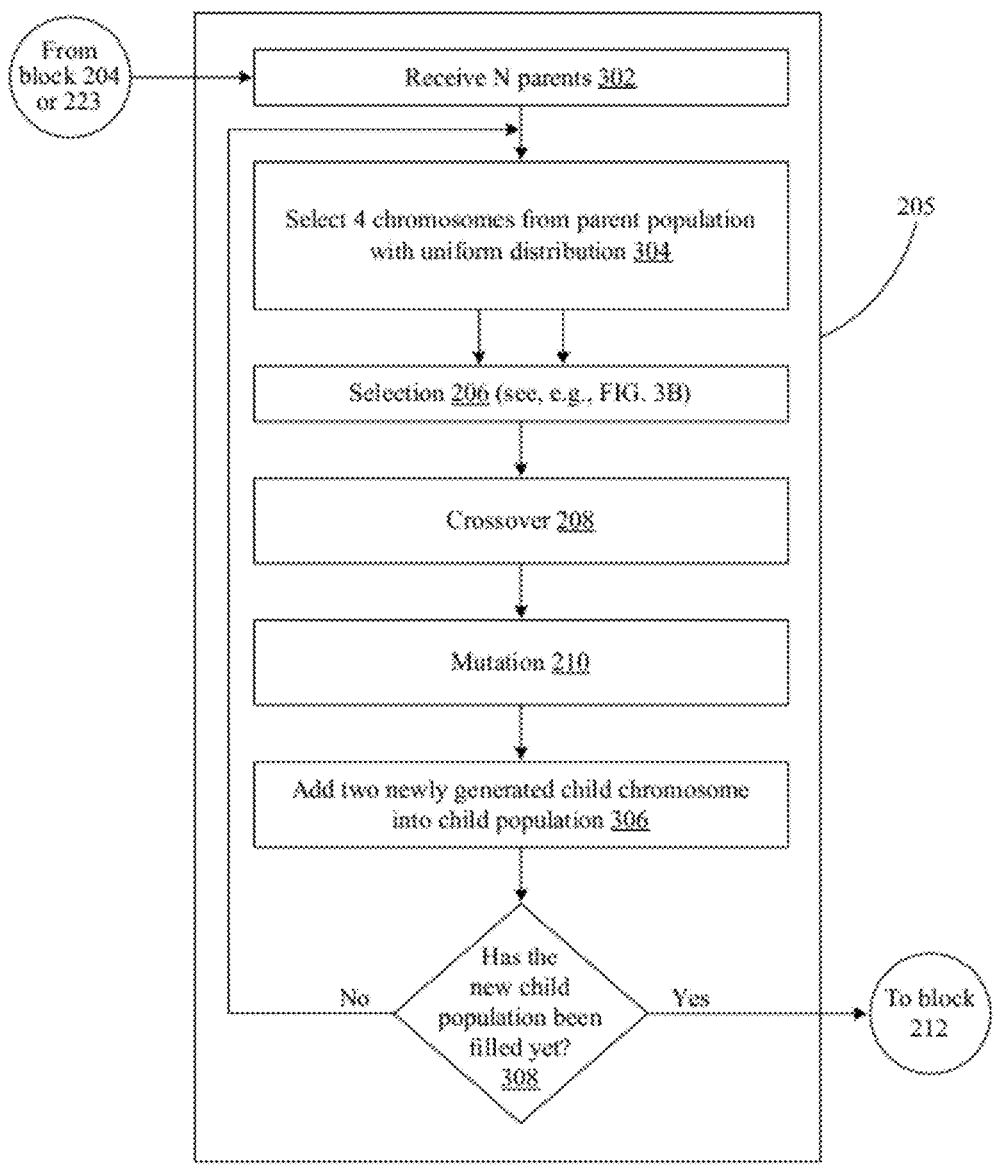
FIG. 3A illustrates an example process for generating a child population of chromosome data structures, according to an example embodiment of the invention.

Accordingly, having received or obtained the initial population of parent chromosome data structures in block 204 (or block 223), processing may then proceed to block 205 for generation of a child population of chromosome data structures based upon these parent chromosome data structures. FIG. 3A illustrates an example process for implementing block 205, according to an example embodiment of the invention. Turning now to FIG. 3A, at block 302, the initial population of N parent chromosome data structures may be received or obtained from block 204 or 223. In particular, the population of N parent chromosome data structures may be obtained or retrieved from a previous generation/iteration (block 223) and/or from block 204 via an archive checkpoint (block 202).

Following block 302 is block 304, where two pairs of chromosome data structures (i.e., a total of four chromosome data structures) may be selected from the parent population. In an example embodiment of the invention, two pairs of chromosome data structures may be selected, perhaps with equal probability based upon a uniform distribution of the input population. As such, it may be possible that a particular parent chromosome data structure may be present in two or more selected pairs of parent chromosome data structures, according to an example embodiment of the invention. Each pair of chromosome data structures may be provided to the selection process in block 206.

Still referring to FIG. 3A, in block 206, the master processor 106 may receive a pair of parent chromosome data structures from block 304. The received pair of chromosome data structures may be subject to a crowded tournament selection process involving a plurality of declared sub-dimensional subsets, where the plurality of declared sub-dimensional subsets collectively define the restricted searchable space for an optimization involving a plurality of variables.

Figure 3B:
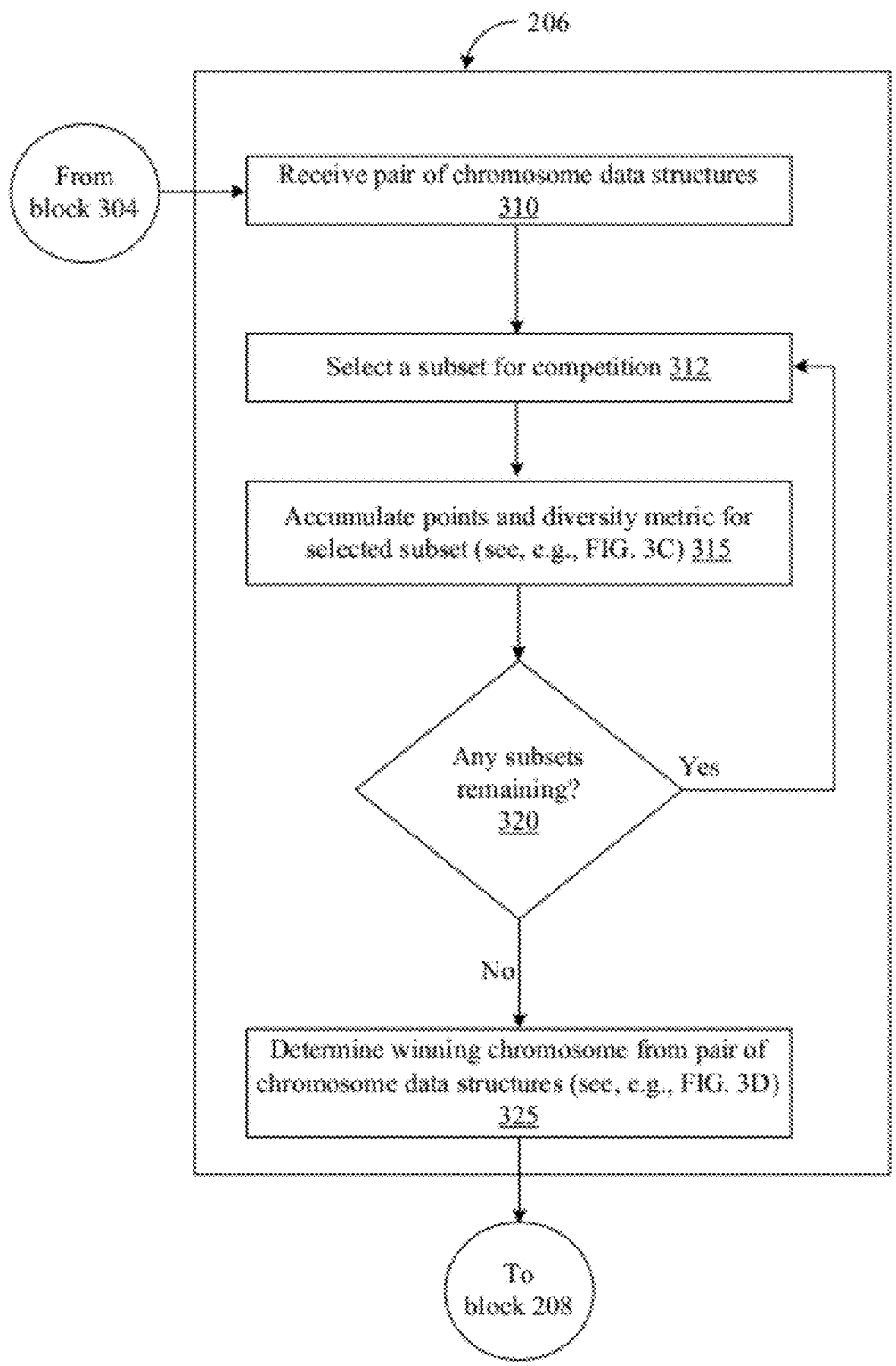
FIGS. 3B-3D illustrate an example selection process, according to an example embodiment of the invention.
Figure 3C:
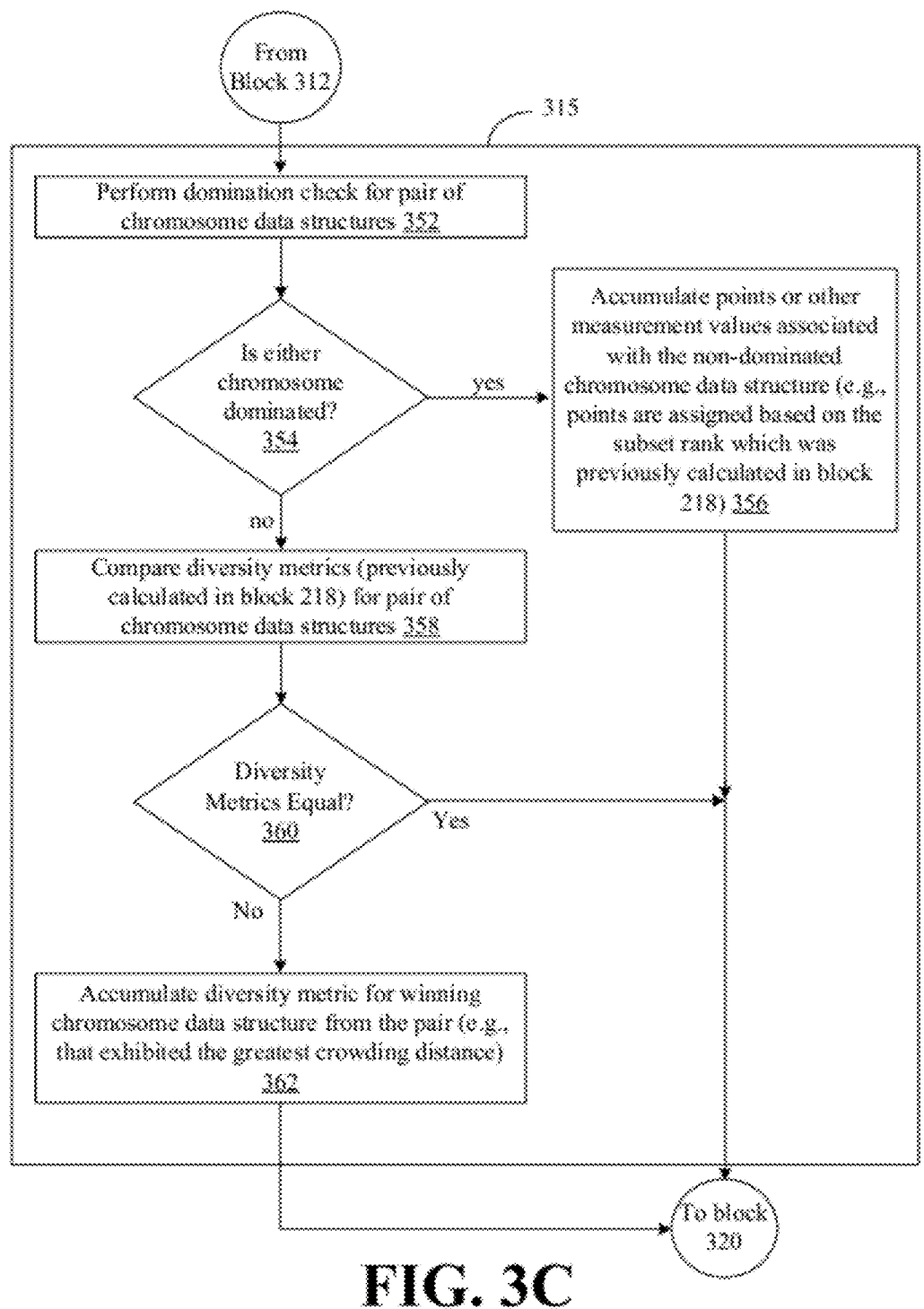
Figure 3D:
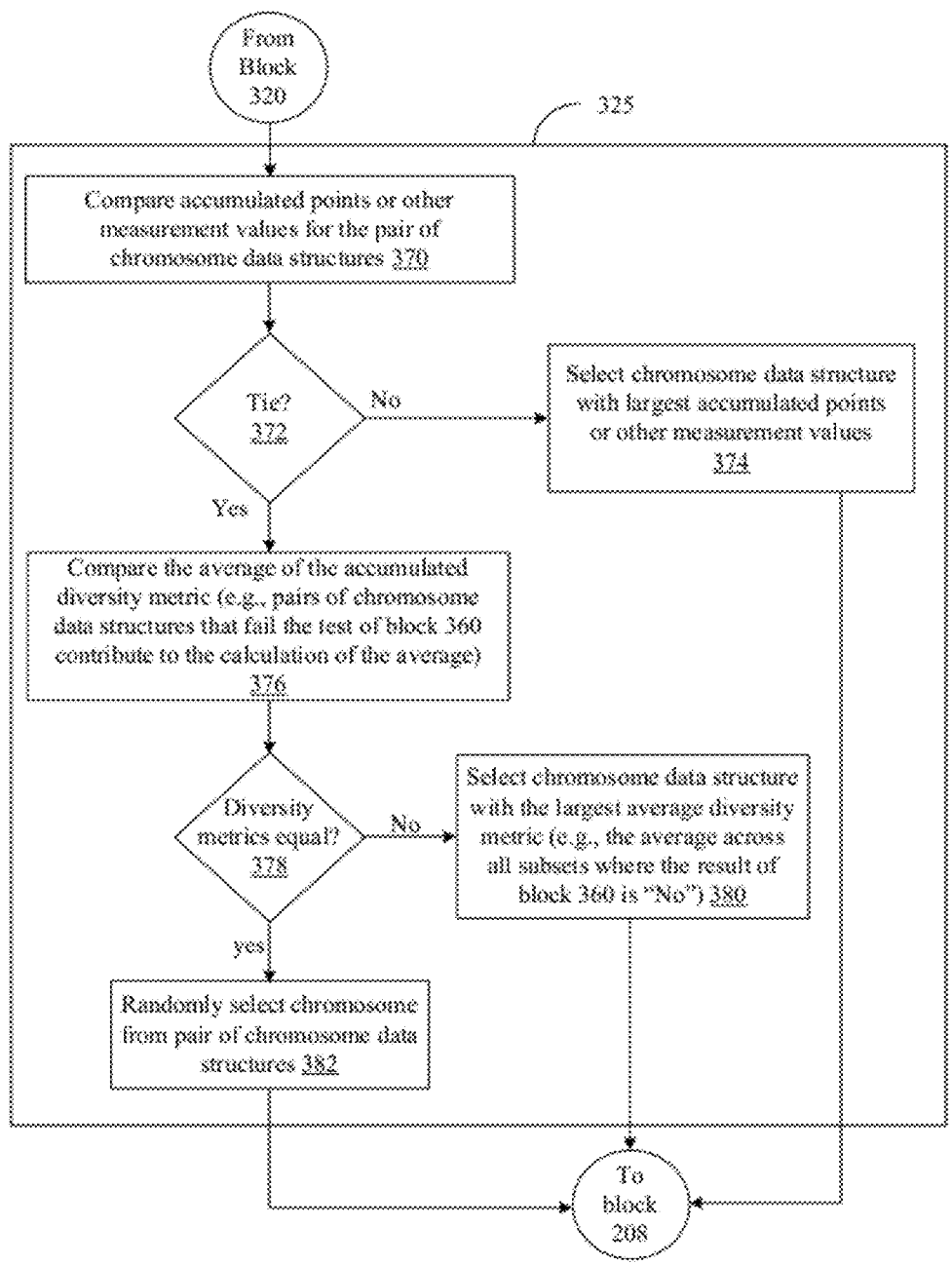

As will be illustrated in more detail with respect to FIGS. 3B-3D, in block 206, pairs of parent chromosome data structures may compete in a tournament selection process for each declared subset from the plurality of declared sub-dimensional subsets. In general, the tournament selection process may determine, via a domination check, whether a chromosome data structure dominates the other chromosome data structure within a respective subset. However, simply counting the number of subset non-domination instances (e.g., the number of times a chromosome data structure is non-dominated or "wins") may result in the selection of an inferior solution (e.g., chromosome data structure A could be rank 1 in the first subset, rank 30 in the second subset, and rank 25 in the third subset, and not be selected over chromosome B that is rank 15 in the first subset, rank 15 in the second subset, and rank 15 in the third subset, where rank "1" represents a non-dominated (superior) solution while higher-numbered ranks represent increasingly dominated (and inferior) solutions within a population). Accordingly, in addition or in the alternative, points or other units of measure may be accumulated for a chromosome data structure for each subset that it dominates in. For example, if a chromosome data structure dominates a particular subset, it may accumulate points based upon its subset domination ranking obtained from its associated rank array. Thus, accumulation of points or other units of measurement may be used to balance elite chromosome selection while allowing potentially, but not vastly inferior, chromosome data structures to participate. Upon completion of the tournament selection process for the subsets, the overall winning chromosome data structure can be determined based at least in part by comparing the accumulated points or other units of measure for each chromosome data structure of the pair. The overall winning chromosome data structures of each tournament become the two parents resulting from the selection process of block 206.

Following block 206, the chromosomes in selected pairs of parent chromosome data structures may be subject to one or more evolutionary operators to generate a plurality of child chromosome data structures, according to an example embodiment of the invention. Two example evolutionary operators are illustrated by blocks 208 and 210. For example, block 208 illustrates a crossover evolutionary operator in which a portion of the parameter values or "gene" values may be exchanged between chromosomes in selected pairs of parent chromosome data structures to generate new pairs of chromosome data structures. In an example embodiment of the invention, the crossover evolutionary operation may be capable of performing crossover using integer or non-integer numbers (e.g., double precision numbers, etc.), binary representation of numbers, letters, and/or symbols. As another example, block 210 illustrates a mutation evolutionary operator in which a parameter value or gene value (e.g., an evolved variable value) in a chromosome of a chromosome data structure may be varied or otherwise changed to another value by a mutation.

It will be appreciated that the crossover evolutionary operator and the mutation evolutionary operator need not necessarily be applied to genes of each received chromosome in the chromosome data structure. In an example embodiment of the invention, only a portion or percentage of the received chromosomes in the chromosome data structures in blocks 208 and 210 may have their genes crossed-over or mutated, respectively. The respective portions or percentages that are crossed-over and/or mutated may be predetermined or dynamically varied during operation of the evolutionary algorithm, according to an example embodiment of the invention. For example, a first predetermined portion or percentage (e.g., 50%-80%) of the received chromosomes of the chromosome data structures may have genes that are crossed over in block 208 while a second predetermined portion or percentage (e.g., 1%-3%) of the received chromosomes of the chromosome data structures may have genes that are mutated in block 210. On the other hand, for dynamic variations, the respective portions or percentages that are crossed-over and/or mutated may be increased or decreased during runtime to increase or decrease the rate of evolutionary progress as desired or required. It will be appreciated that other evolutionary operators besides blocks 208 and 210 may be available without departing from example embodiments of the invention. Likewise blocks 208 and 210 may be performed in a different order than that shown in FIG. 2 or otherwise combined into a single block without departing from example embodiments of the invention.

Still referring to FIG. 3A, at block 306, the two newly generated chromosome data structures (based upon two pairs of chromosome data structures being processed via blocks 206, 208, 210) are added to the child population. Following block 306, processing may proceed to block 308 to determine whether enough child chromosome data structures have been produced for the child population (e.g., based upon one or more thresholds). If not enough chromosome data structures have been produced to fill the new child population, then processing may return to block 304 discussed above, and following the subsequent processing, additional chromosome data structures may be added to the child population in block 306. On the other hand, if block 306 determines that enough chromosome data structures have been produced to fill the child population, then processing may proceed to block 212 of FIG. 2. It will be appreciated that the size of the child population may be fixed, or may be varied if desirable, from connected run to connected run, according to an example embodiment of the invention.

Returning back to FIG. 2, a new population of child chromosome data structures may be obtained in block 212. Following block 212, processing may proceed to block 214. In block 214, the new population of child chromosome data structures may be received into a "To Evaluate" list or queue (see also FIG. 4, which illustrates an example implementation of block 214 in further detail). Block 214 may then allocate the chromosome data structures from the "To Evaluate" list or queue to the plurality of slave processors 108 according to an asynchronous evolution process.

In block 215, each slave processor 108 may have received a chromosome bundle comprising one or more chromosome data structures from the master processor 106. The slave processors 108 may be homogenous or heterogeneous in processing capability. Each slave processor 108 may evaluate, in accordance with a plurality of objective functions, the received chromosome data structures to generate a plurality of respective objective function values for each chromosome data structure in block 215. In addition, each slave processor 108 may also perform timing operations or calculations, including determination of certain wait times and/or evaluation times associated with the respective slave processor 108, in block 215. As each slave processor 108 finishes the objective function evaluations and/or timing operations in block 215, the slave processor 108 may provide the evaluation results (e.g., objective function values) and timing data (e.g., wait times and/or objective function evaluation times) to the master processor 106. The master processor 106 may provide the received objective function values as well as an identification of the corresponding evaluated child chromosome data structures to a "Finished" list or queue. It will be appreciated that with asynchronous evolution processing, the objective function results may be included in the "Finished" list or queue on an as-received basis from the slave processor 108. Indeed, the evolutionary process is asynchronous in that as soon as the "To Evaluate" list is empty for a given generation/iteration 221 is completed, where the child population passed to block 216 is comprised of all of the chromosome data structures currently within the "Finished" list. It will be further appreciated that the results from some of the chromosome bundles previously sent to the various slave processors 108 may not have been received at the time the "To Evaluate" list is emptied. These may be referred to as late chromosome data structures from one or more prior generations/iterations.

In block 216, the master processor 106 receives a modified child population of chromosome data structures from the asynchronous evolution process of block 214. The modified child population may include different chromosome structures as well as a different number of chromosome data structures as compared to the child population of block 212. The received modified child population is merged with the current parent population, as illustrated by block 216.

Figure 5A:
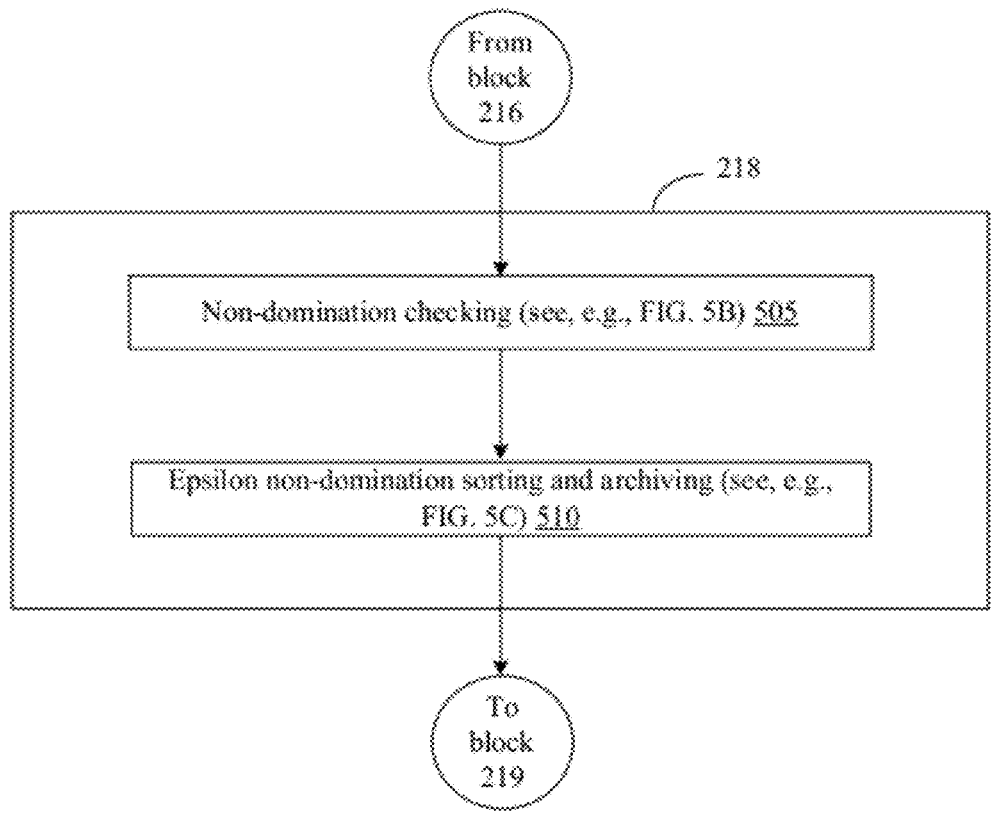
FIGS. 5A-5C illustrate example non-dominating sorting, epsilon non-domination sorting, and archiving in accordance with an example embodiment of the invention.
Figure 5B:
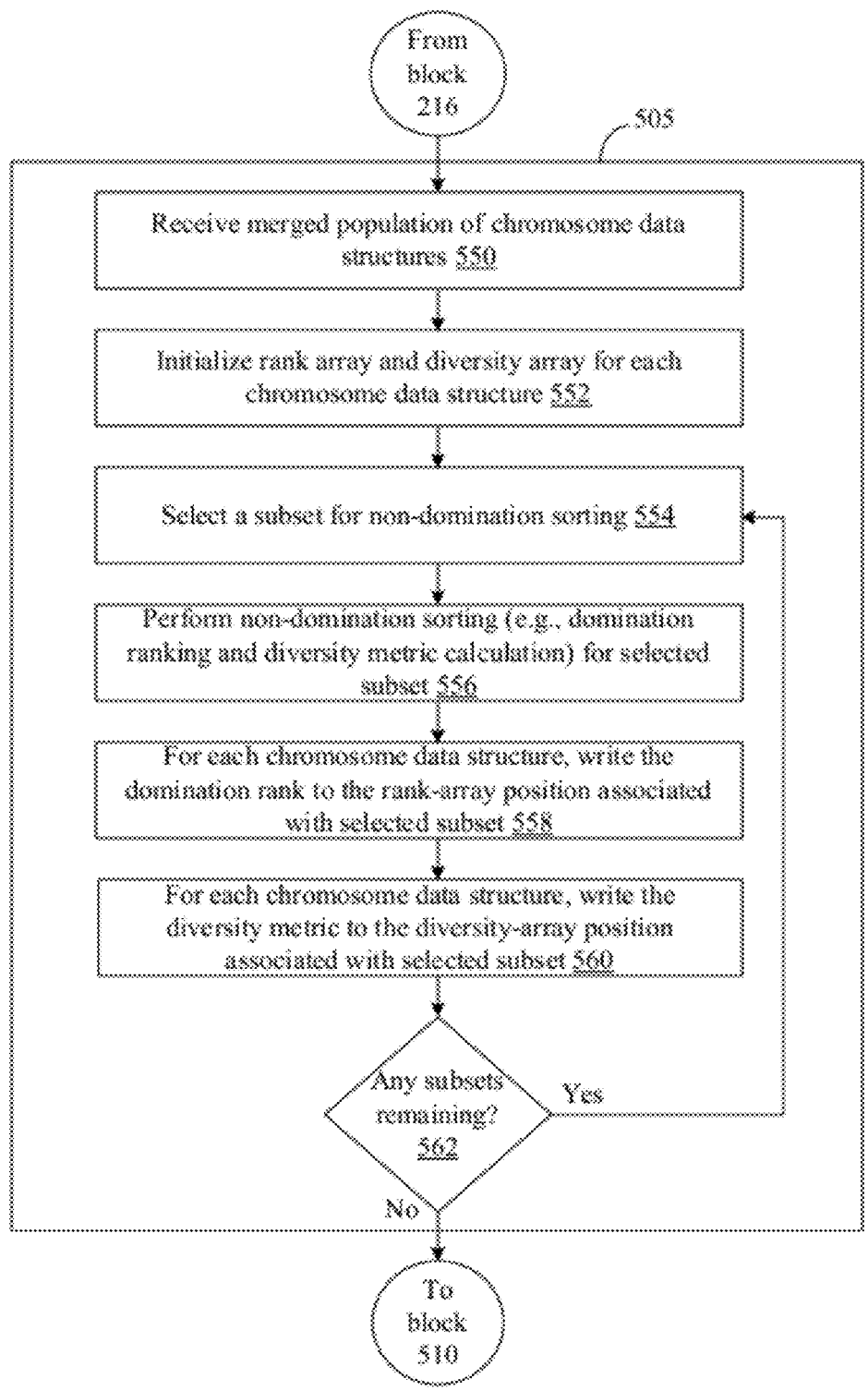
Figure 5C:
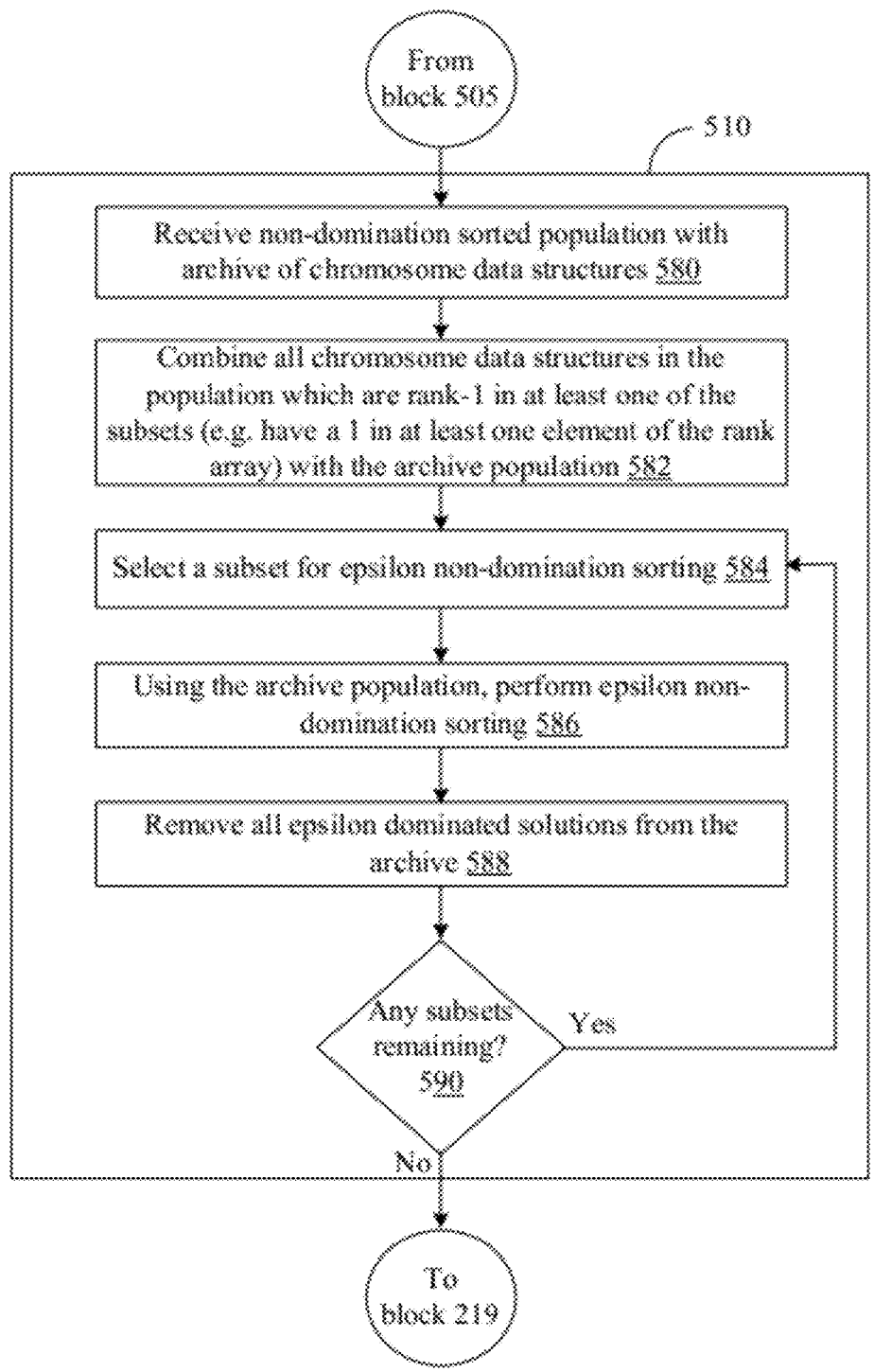

In block 218, the master processor 106 may perform non-domination sorting, and epsilon non-domination sorting and archiving, as described in further detail with respect to FIGS. 5A-5C. In general, non-domination sorting may be performed (e.g., domination ranking and diversity metric calculation) for each subset of the plurality of declared sub-dimensional subsets. More specifically, for each subset, the master processor 106 may perform non-domination sorting, on a subset-by-subset basis, of the merged list of child and parent chromosome data structures to provide each chromosome data structure with a rank array equal in dimension to the total number of subsets defined for optimization over the subspace. Accordingly, following the non-domination sorting, each chromosome data structure may have an associated rank array indicating the respective domination rank for each subset. Likewise, diversity metrics may likewise be determined for each chromosome data structure to provide a diversity array indicating the respective diversity metric for each subset. Following non-domination sorting, block 218 may also perform epsilon non-domination sorting and archiving. In general, those chromosome data structures that survive subset-based epsilon non-domination sorting and that are epsilon non-dominated in at least one subset may be passed to the archive and represent the set of elite solutions for a particular generation.

Following processing in block 218, processing may proceed to block 219. In block 219, a determination is made as to whether the current job is completed such that the evolutionary algorithm should be terminated. A job typically comprises processing involving a plurality of connected runs 222, where each run 222 may include processing associated with one or more generations/iterations 221. Block 219 may include, but is not limited to, termination based upon whether the search has failed to produce sufficient improvement in solutions for each declared subset over a predefined number of generations/iterations or whether a maximum number of function evaluations has been completed or a maximum time (e.g., based upon a wall clock time) has elapsed. For example, the evolutionary algorithm may terminate, according to sufficient improvement termination criteria, if a predetermined percentage (e.g., 90%) of the obtained solutions remain in the same epsilon rectangles, volumes, or hypervolumes/hyperrectangles for each declared subset for a prior number of generations (e.g., the last 20 generations), or alternatively, across a prior number of connected runs, in accordance with an example box fitness termination criteria (see, e.g., FIG. 8). It will be appreciated that the obtained solutions comprising the chromosome data structures may be output in a variety of formats, including a database format, a comma separated value (CSV) format, or a graphical format.

If block 219 determines that the job is not complete, then processing may proceed to block 220 to determine whether the current run 222 has completed. In determining whether the current run is complete, block 220 may determine whether a current run 222 has failed to produce improvement in quantity and quality of the solutions generated from the prior iterations/generations 221. The quantity measure may be based upon the number of solutions. The quality measure may be based on some quantification of distance from a utopia point, box fitness (e.g., described with respect to FIGS. 8A-8F), or yet another measure.

If block 220 determines that a current run 222 is not complete, then processing may proceed to block 223, wherein a population of parent chromosome structures may be obtained or otherwise selected from the elite chromosome data structures determined from block 218. The prior process is then repeated for another generation/iteration 221 using the parent chromosome data structures from the prior generation/iteration. It will be appreciated that because the evolution process of block 214 is asynchronous, there may be one or more late child chromosome data structures received in the "Finished" list or queue in block 216 that are associated with one or more pairs of parent chromosome data structures allocated to slave processors 108 during one or more prior generations/iterations. Therefore, in the next generation/iteration 221, the merged child chromosome data structures in block 216 may likewise include those late child chromosome data structures as well as current child chromosome data structures from parent chromosome data structures allocated to slave processors 108 during the current generation/iteration 221.

On the other hand, block 220 may determine that a current run 222 is complete. For example, looking back over a predetermined number of generations, the search may have failed to produce improvement in the solutions during each generation/iteration 221 of the current run 222. Improvement may be based upon the quantity of the solutions (e.g., the number of solutions) and the quality of the solutions (e.g., some quantification of distance from a utopia point, box fitness, etc.). In this case, the current run 222 is completed, and processing proceeds to initiate a subsequent run 222. The subsequent run 222 may generate an initial population by invigorating the elite solutions stored in the archive checkpoint 202. In particular, the subsequent run 222 may utilize a first number of the elite solutions from the archive checkpoint 202 as part of the initial population utilized in block 204, but may also invigorate the initial population by adding a second number of randomly generated parent chromosome data structures. The randomly generated parent chromosome data structures may be generated and evaluated using the example processes discussed with respect to blocks 204 and 214.

B. Example Selection Process

FIGS. 3B-3D illustrate an example selection process that may be utilized for block 206 of FIG. 3A, according to an example embodiment of the invention. While FIGS. 3B-3D may provide an example implementation for block 206 of FIG. 3A, it will be appreciated that many other variations are available without departing from example embodiments of the invention.

Turning now to FIG. 3B, in block 310, a pair of chromosome data structures may be obtained or retrieved from block 304 of FIG. 3A. Following block 310 is block 312, where a subset is selected from the plurality of declared sub-dimensional subsets. As described herein, a decision maker may have specified or otherwise declared the subsets that were included in the plurality of declared sub-dimensional subsets.

Following block 312 is block 315, where for each chromosome data structure, a unit of measure (e.g., points) and a diversity metric for the selected subset may be accumulated. An example process for block 315 will now be described with respect to FIG. 3C. Turning now to FIG. 3C, at block 352, a domination check is performed for the pair of chromosome data structures. For example, a first solution $x_1$ is said to dominate a second solution $x_2$ for a particular subset if both conditions 1 and 2 identified below are true:

Condition 1: The solution $x_1$ is no worse than $x_2$ in all objectives associated with the particular subset.
Condition 2: The solution $x_1$ is strictly better than $x_2$ in at least one objective associated with the particular subset.

If both conditions 1 and 2 are satisfied, then all of the following statements are substantially equivalent:
$x_2$ is dominated by $x_1$ for a particular subset,
$x_1$ is non-dominated by $x_2$ for a particular subset, or
$x_1$ is non-inferior to $x_2$ for a particular subset.

Accordingly, at block 354, the respective objective function values for those objective functions associated with the selected subset may be used to determine whether either chromosome data structure is dominated by the other solution. If so, then processing may proceed to block 356, where points or other measurement values are accumulated for the non-dominated, winning chromosome data structure. It will be appreciated that the number of points or measurement values accumulated for the non-dominated chromosome data structure may be based upon the subset domination rank that was previously calculated in block 218. Indeed, as discussed in further detail below, the points or measurement scheme may represent a balance between the search and selection pressure that allows an inferior chromosome data structure (relative to the entire population) a chance to "win" and propagate its attributes or genes.

According to an example embodiment of the invention, a chromosome data structure having the highest possible subset domination rank (e.g., a non-dominated solution having a rank of "1") may accumulate the maximum number of available points or measurement values. On the other hand, a chromosome data structure having a less-than-best subset domination rank may accumulate a less-than-maximum number of available points, including zero points. Table I below is an example illustration of a points accumulation scheme for particular domination ranks, according to an example embodiment of the invention. It will be appreciated that different points values may be assigned for different domination ranks without departing from example embodiments of the invention. It will also be appreciated that in some embodiments, the points values could be configured so that winning solutions accumulate lower numbers of points than losing solutions without departing from example embodiments of the invention.

TABLE I

| Domination Rank for a Given Subset | Number of Points Assigned |
|---|---|
| 1 | 10 |
| 2 | 6 |
| 3 | 4 |
| 4 | 2 |
| 5 | 1 |
| 6 | 0.5 |
| >6 | 0 |

In the instance where neither chromosome data structure is dominated by the other in block 354, processing may proceed to block 360. Block 360 may determine whether the diversity metrics for the two chromosome data structures are equal. If the diversity metrics are equal, then no points or diversity metrics may be accumulated for either chromosome data structure, and processing of block 315 may be complete such that processing may proceed to block 320 of FIG. 3B. On the other hand, if the diversity metrics are not equal, then processing may proceed to block 362. At block 362, diversity metrics may be accumulated for the subset winning chromosome data structure that exhibits the greatest measure of diversity. The diversity metrics (e.g. the crowding distance) may be a way to measure how close a given chromosome data structure is to others within a population (e.g., population from block 216). In an example embodiment of the invention, a larger value for the diversity metric may indicate that the given chromosome data structure is further away from others, and is thus, more diverse. Accordingly, a more diverse chromosome data structure may generally be a more desirable result for multi-objective optimization problems. Hence, less diverse chromosome data structures may be eliminated or thinned out. It will be appreciated that each chromosome data structure has a crowding-distance array with crowding distances for each subset. Accordingly, when two competing parent chromosome data structures are non-dominated with respect to each other (block 354) and the diversity metrics are not equal (block 360), then the diversity metrics (e.g., crowding distance) for each parent chromosome data structure are used to determine the winner of the tournament. In an example embodiment of the invention, the actual diversity metric used during the comparison between chromosome data structures in a tournament may be found from the accumulated average of the non-dominated subset crowding distances. Following block 362, processing of block 315 may be complete such that processing may proceed to block 320 of FIG. 3B.

Returning now to FIG. 3B, block 320 may determine whether the chromosome data structure has been evaluated in block 315 with respect to all subsets in the plurality of declared sub-dimensional subsets. If any subsets remain, then processing may return to block 312 where another subset may be selected. On the other hand, if no subsets in the plurality of declared sub-dimensional subsets remain, then processing may proceed to block 325.

In block 325, the winning chromosome data structure from the pair may be determined. An example process for block 325 will now be described with respect to FIG. 3D. In block 370, the respective accumulated points or measurement values for each chromosome data structure may be compared. If the respective accumulated points or measurement values are not equal (block 372), then processing may proceed to block 374, where the chromosome data structure with the largest accumulated points or other measurement values may be selected as the overall winning chromosome data structure, which is then identified for block 208.

On the other hand, the respective accumulated points or other measurement values may be equal (block 372) in which case processing may proceed to block 376. In block 376, the accumulated diversity metrics for each chromosome data structure may be compared. It will be appreciated that the accumulated diversity metrics for each subset may be used to calculate an average diversity metric across the subsets, which may be used for decision block 378. If the diversity metrics are not equal (block 378), then processing may proceed to block 380, where the chromosome data structure with the largest diversity metric (e.g., largest average diversity metric) may be selected as the overall winning chromosome data structure. On the other hand, if the diversity metrics are equal (block 378), then processing may proceed to block 382, where one of the pair of chromosome data structures may be randomly selected as the overall winning chromosome data structure, which is then identified for block 208.

The points or other measurement scheme introduced will now be discussed in further detail. In general, the points or other measurement scheme may be developed to balance the search and selection pressures. Indeed, it is possible that, relative to the entire population, that the two chromosomes undergoing a tournament have different ranks, but when compared to each other, they may both be non-dominated, and the utilized points or other measurement scheme may impact the likelihood that the inferior chromosome (relative to the population) can "win" and pass on its attributes or genes.

As a more particular example, a domination check can be applied to the two chromosomes (chrom-A and chrom-B) competing in the tournament with respect to each other (as opposed to the non-domination sorting of box 218 which is with respect to the entire population). Chrom-A may be in rank-1 and chrom-B may be in rank-2 (relative to the entire population), but when chrom-A and chrom-B are compared against each other in isolation, they may be non-dominated with respect to each other. In this situation, during the non-domination-sorting (of box 218), some other chromosome within the population (say chrom-C) must have dominated chrom-B causing it to be demoted to a lower rank. However, in the tournament selection (e.g., block 206), when chrom-A and chrom-B are competing only against each other, chrom-B which is inferior to chrom-A as far as rank is concerned may have a chance to be "elevated" and awarded a "win" based upon accumulated points or other units of measure for each subset. Thus, search pressure can be balanced with selection pressure based upon the configuration of the points or other measurement scheme, allowing for the search to continue into the area represented by chrom-B's attributes or genes.

Illustrative Embodiment: To further illustrate the selection process of block 206, the following example is provided. In this example, we assume that there is an optimization problem involving four objectives, where each objective may be indexed as follows:

0, minimize cost;
1, maximize design life;
2, maximize performance; and
3, maximize luxury.

With these four objectives, there may be a plurality of subsets, which include but are not limited to:

Subset #1: {0, 1} relating to tradeoffs between cost and design life;
Subset #2: {0, 2}, relating to tradeoffs between cost and performance; and
Subset #3: {0, 3}, relating to tradeoffs between cost and luxury.
Subset #4: {1, 2}, relating to tradeoffs between design life and performance.
Subset #5: {1, 3}, relating to tradeoffs between design life and luxury.
Subset #6: {0, 1, 2}, relating to trade offs among cost, design life, and performance.
Subset #7: {1, 2, 3}, relating to tradeoffs among design life, performance, and luxury.
Additional subsets are available, but are not listed for brevity.

The plurality of subsets may collectively define the total dimensions for an unbiased optimization for the four objectives of cost, design life, performance, and luxury.

For this restricted search, a decision maker may only be interested in three tradeoffs between (1) cost and design life, (2) cost and performance, and (3) cost and luxury. Accordingly, only subsets #1 ({0, 1}) #2 ({0, 2}), and #3 ({0, 3}) may be selected, which may form the plurality of declared sub-dimensional subsets. For purposes of this restricted search, there may also be a population that includes at least five solutions (e.g., chromosome data structures), as illustrated in Table II. A snapshot of the domination rank arrays at a particular generation/iteration is also illustrated for each of the five solutions in Table II. Recall that a rank array has a dimensionality equal to the total number of subsets in the plurality of declared sub-dimensional subsets—in this example, three declared subsets.

TABLE II

| Solution | Domination rank |
|---|---|
| 1 | [1, 5, 5] |
| 2 | [2, 3, 3] |
| 3 | [2, 2, 2] |
| 4 | [1, 2, 3] |
| 5 | [8, 1, 7] |

To select a parent chromosome data structure, two of these solutions, for example solutions 1 and 2, may be pulled from the population and compete in a tournament. A domination check may be performed for each subset. Based upon the domination check, solution 2 may be dominated relative to solution 1 in Subset #1 (cost versus design life: {0, 1}), and therefore, solution 1 receives 10 points, using the scoring scheme of Table I, because it has a domination rank of 1 in that subset. Solution 1 may be dominated relative to solution 2 in subsets 2 and 3 (cost versus performance: {0, 2}, and cost versus luxury: {0,3}), and therefore solution 2 receives 8 points, again using the scoring scheme of Table I, because it has a domination rank of 3 in each of these subsets. In this case, there is a clear winner: solution 1 with a point score of 10, and which is identified as the overall winning chromosome data structure. However, if there had been a point tie, diversity metrics such as the average crowding distance described herein may be used to determine the winner of the tournament. The process may be repeated to select another overall winning chromosome data structure to produce a pair of chromosome data structures for receipt by block 208.

In another example embodiment, to select another parent chromosome data structure, two additional solutions, for example solutions 3 and 4, may be pulled from the population and compete in a tournament. A domination check between the two solutions may be performed for each subset. Based upon the domination check between the two solutions (e.g., not among an entire population as when the domination rank in Table II was previously determined), solution 3 is non-dominated with respect to solution 4 in Subset #1. Accordingly, solution 3 would "win" for Subset #1, and would accumulate 6 points. Thus, solution 3 has been elevated even though it has a lower rank (within subset #1). With respect to Subset #2, solutions 3 and 4 can be non-dominated with respect to each other. However, in this case, diversity metrics (for each solution for Subset #2) may be used to determine that solution 4 is more diverse than solution 3 for Subset #2. In this case, solution 4 would win for Subset #2, and would accumulate 6 points. With respect to Subset #3, based upon the domination check, solution 3 dominates solution 4. In this case, solution 3 is awarded 6 points. Based upon a summation of the points, solution 3 has accumulated 12 points while solution 4 has accumulated 6 points. Thus, solution 3 would win the overall tournament even though solution 4 has at least one overall rank of 1 for a subset (and hence, solution 4 would reside in the archive checkpoint 202). It will be appreciated that even though solution 3 wins against solution 4, it does not reside in the archive checkpoint 202 because it has no subsets with an overall rank of 1. However, by winning against solution 4, it is possible that a child chromosome data structure derived at least in part from solution 3 may have an opportunity to be included in the archive checkpoint 202 if that child chromosome data structure has an overall rank of 1 for at least one subset.

C. Asynchronous Evolution

Figure 4:
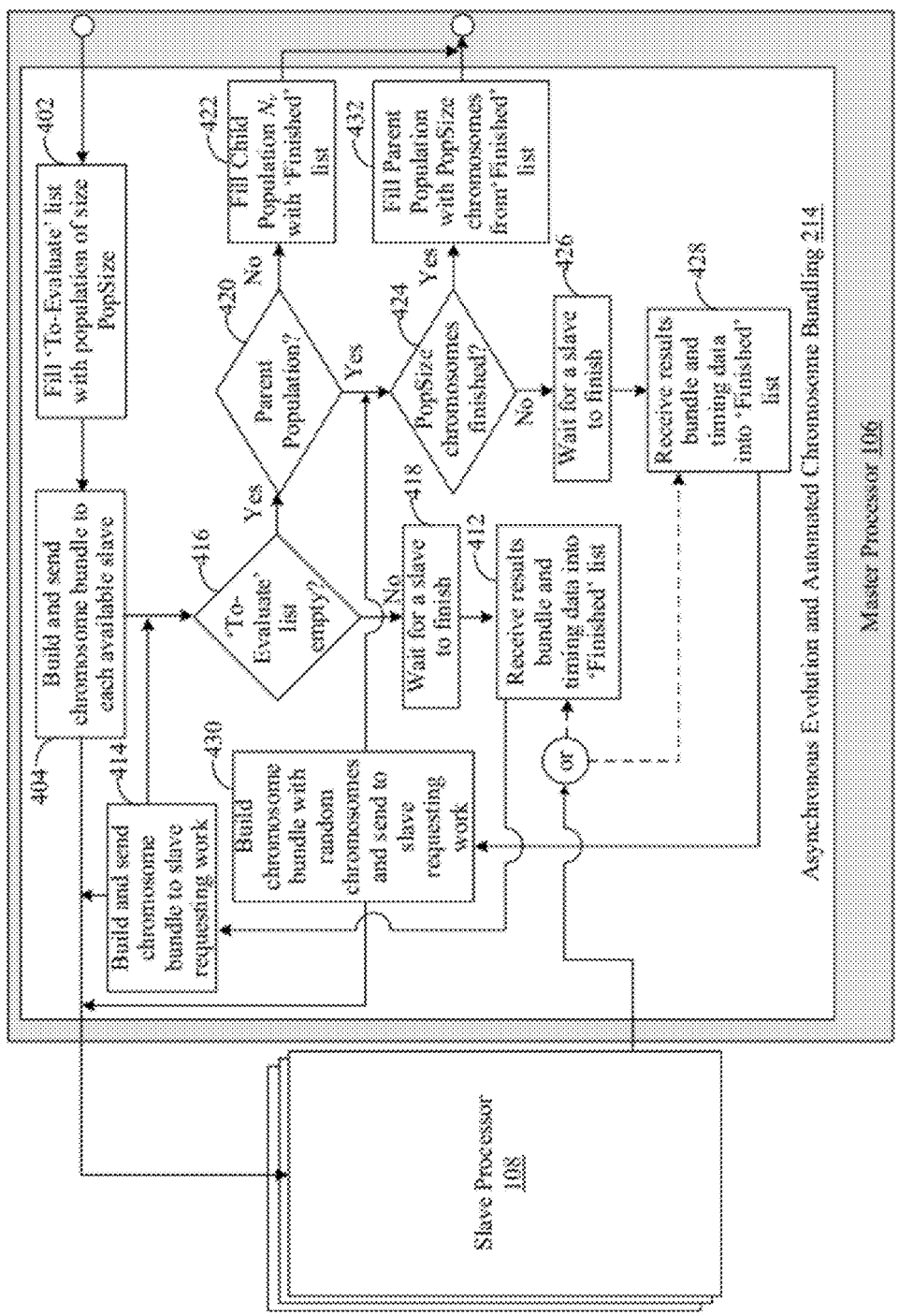
FIG. 4 illustrates an example flow diagram for an asynchronous evolution process, according to an example embodiment of the invention.

FIG. 4 illustrates an example implementation of an asynchronous evolution that may be utilized for block 214 of FIG. 2. It will be appreciated that the example asynchronous evolution process of FIG. 4 is provided by way of example only, and that many variations are available without departing from example embodiments of the invention.

The asynchronous evolution process can be utilized in conjunction with at least two example scenarios: (i) evaluation of a randomly generated initial population (e.g., block 204 of FIG. 2) or (ii) evaluation of a new child population (e.g., block 212 of FIG. 2).

Turning now to FIG. 4, the process begins with block 402 in which a "To Evaluate" list or queue is filled with either (i) the randomly generated input population of parent chromosome data structures from block 204, or (ii) the new child population of chromosome data structures from block 212. In block 404, the master processor 106 allocates the chromosome data structures from the "To-Evaluate" list or queue to some or all of the plurality of slave processors 108. More specifically, in block 404, the master processor 106 may build a chromosome bundle for each available slave processor 108 that is to receive work. It will be appreciated that some slave processors 108 may be busy processing chromosome bundles from previous generations/iterations. The number of chromosome data structures included within each chromosome bundle may be varied without departing from example embodiments of the invention. Indeed, in some embodiments, a chromosome bundle may comprise only a single chromosome data structure.

In an example embodiment of the invention, a goal of the bundling in block 404 may be to help keep the slave processors 108 at a fairly high (e.g., nearly 100%) utilization rate. Increasing the bundle size decreases the number of packets sent across the network and helps to minimize the time the slave processors 108 are waiting for work. However, if the bundle size is too large, a lag or delay may result in which a chromosome data structure may be potentially outdated by the evolutionary progress. The equilibrium bundle size may be dependent on the function evaluation times of the slave processors 108 and the network capability.

The chromosome bundles generated in block 404 may be allocated to the slave processors 108. Each slave processor 108 may evaluate, in accordance with a plurality of objective functions, the received chromosome bundle of chromosome data structures to generate a plurality of respective objective function values for each chromosome data structure. In addition, each slave processor 108 may also perform timing operations or calculations, including a determination of the Rolling_Average_Wait_Time and Average_Function_Evaluation_Time associated with the respective slave processor 108. As each slave processor 108 finishes the objective function evaluations and/or timing operations in block 215, the slave processor 108 may provide a results bundle (e.g., objective function values) and timing data to the master processor 106. The results bundle and timing data may be received in the "Finished" list or queue in block 412 or block 428, depending on the states of blocks 416, 420, and 424.

In particular, if the "To-Evaluate" list or queue is not empty (block 416), then the master processor 106 may wait for one or more slave processors 108 to finish, and the results bundle and timing data may be received into the "Finished" list or queue in block 412. Processing may then proceed from block 412 to block 414, where additional chromosome data structures from the "To-Evaluate" list or queue may be allocated in one or more chromosome bundles to one or more slave processors 108 that have previously finished processing and are waiting for additional work.

Once the "To-Evaluate" list or queue is empty, processing may proceed to block 420 to determine whether a parent population is being evaluated. If not, then the "Finished List" may be filled with the evaluated child population of chromosome data structures in block 422. On the other hand, if the parent population is being evaluated, then processing may proceed to block 424 to determine whether a predetermined population size (PopSize) has been evaluated. If so, then processing proceeds to block 432, where the "Finished List" may be filled with the evaluated parent population of chromosome data structures. On the other hand, block 424 may determine that less than the predetermined population size has been evaluated, and processing may proceed to block 426 to wait for one or more slave processors 108 to finish. Following block 426, processing may proceed to block 428 where the results bundle and timing data may be received from the just finishing slave processors 108 into the "Finished" list or queue. Processing may then proceed to block 430, where additional chromosome data structures are randomly generated and allocated in one or more chromosome bundles to one or more slave processors 108 for objective function evaluation.

In an example embodiment of the invention, block 430 may be utilized to keep available slave processors 108 working with randomly generated chromosome data structures until the predetermined parent population size has been reached. The modified parent population must have the prerequisite number of chromosome data structures, and some of the randomly generated chromosomes may complete processing prior to the chromosome data structures originating from the parent population; in this situation they will become part of the modified parent population, which is received back at block 414. The remaining randomly generated chromosomes will eventually complete and become part of a subsequent modified child population. Block 430 may improve efficiency by keeping slave processors 108 more fully employed, according to an example embodiment of the invention.

It will be appreciated that many variations of FIG. 4 are available without departing from example embodiments of the invention.

D. Example Non-Domination Sorting and Archiving

FIGS. 5A-5C illustrate an example non-domination sorting and epsilon non-domination sorting and archiving that may be utilized for block 218 of FIG. 2, according to an example embodiment of the invention. While FIGS. 5A-5C may provide an example implementation for block 218 of FIG. 2, it will be appreciated that many other variations are available without departing from example embodiments of the invention.

Turning now to FIG. 5A, in block 505, a restricted search non-domination sorting may be performed in order to obtain, for each chromosome data structure, respective domination ranks and/or diversity metrics associated with each subset. A result of the non-domination sorting may be a domination rank array that indicates, for a particular chromosome data structure, the respective domination rank for each subset. In addition, a diversity array may be obtained that indicates, for a particular chromosome data structure, the respective diversity metrics for each subset. It will be appreciated that a given chromosome data structure has a separate diversity metric for each subset, where each diversity metric can represent the "crowding-distance" to all other chromosome data structures that are in the population (e.g., population from block 216). An example process for block 505 will now be discussed in further detail with respect to FIG. 5B, but it will be appreciated that many variations of the process of FIG. 5B are available without departing from example embodiments of the invention.

Turning now to FIG. 5B, at block 550, a merged population or list of chromosome data structures may be received from the processing of block 216. Following block 550 is block 552. At block 552 a rank array and a diversity array may be initialized for each chromosome data structure. For example, if there are four subsets, then, for each chromosome data structure, there may be a rank array and a diversity array each having four positions corresponding to the four subsets. Likewise, for initialization, the values for each position of the rank array and diversity array can be set to a predetermined value (e.g., a null value or zero value).

Following block 552 is block 554, where a subset of the declared sub-dimensional subsets is selected. At block 556, non-domination sorting is performed, according to the selected subset, for the merged list of child and parent chromosome data structures to determine the respective domination ranking and diversity metrics for each chromosome data structure. According to an example embodiment, non-domination sorting may utilize the concept of domination to compare, for each selected subset, solutions provided by the merged list of child and parent chromosome data structures. A solution $x_1$ is said to dominate solution $x_2$ for a particular subset if both conditions 1 and 2 identified below are true:

Condition 1: The solution $x_1$ is no worse than $x_2$ in all objectives associated with the particular subset.

Condition 2: The solution $x_1$ is strictly better than $x_2$ in at least one objective associated with the particular subset.

If both conditions 1 and 2 are satisfied, then all of the following statements are substantially equivalent:

$x_2$ is dominated by $x_1$ for a particular subset, $x_1$ is non-dominated by $x_2$ for a particular subset, or $x_1$ is non-inferior to $x_2$ for a particular subset.

Figure 6:
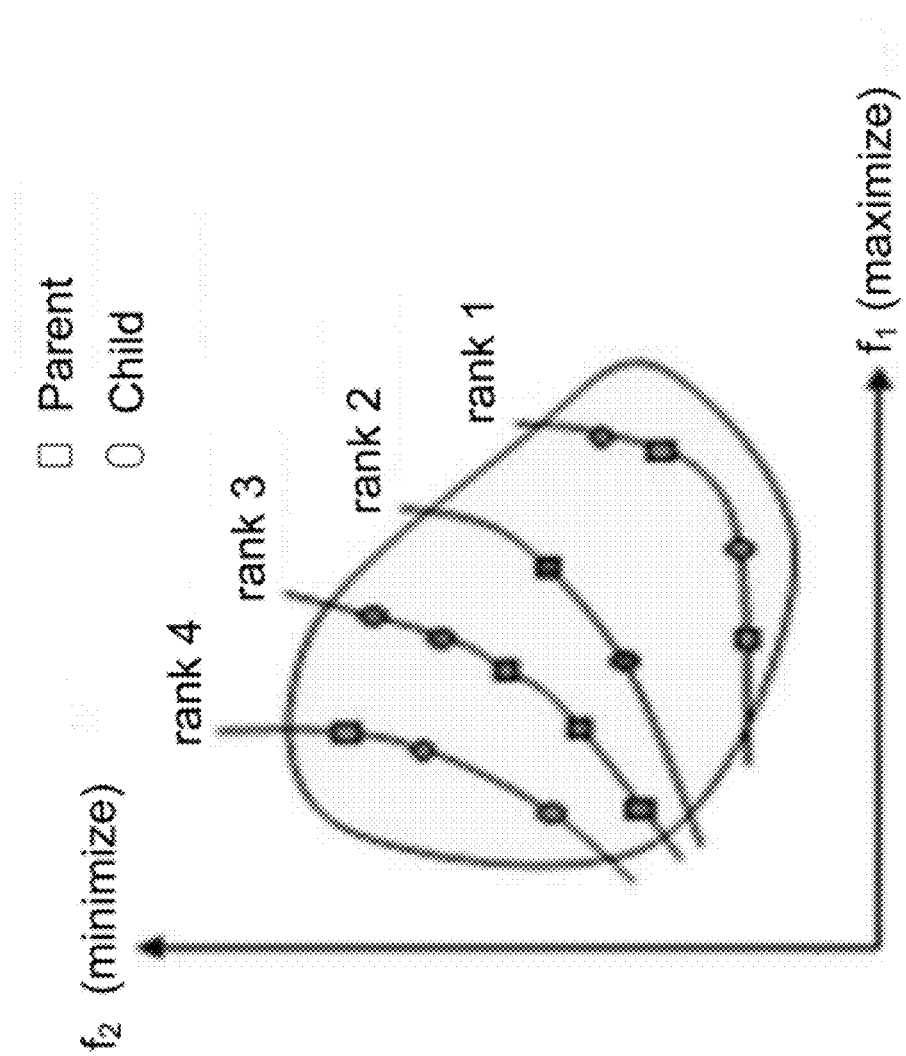
FIG. 6 illustrates an example domination ranking for a population of chromosome data structures, according to an example embodiment of the invention.

Accordingly, non-domination sorting in block 556 may be performed to determine a set of chromosome data structures (e.g., designs) that are non-dominated with respect to other solutions for a particular subset when comparing the respective objective function values corresponding to the objective functions associated with a particular subset. For example, non-domination sorting may involve classifying, for a particular subset, the merged list of child and parent chromosome data structures into multiple fronts (for two objective functions), surfaces (for three objective functions), volume (for four objective functions), or hypervolumes (for 5+ objective functions) based on their respective domination rank. In an example embodiment of the invention, domination ranking may proceed by first considering, for each subset, the entire merged list of child and parent chromosome data structures. For each subset, the objective function values corresponding to the objective functions for each chromosome data structure are compared and the non-dominated solutions from the list are identified. These solutions are assigned a domination rank of 1 and temporarily removed from the merged list. The reduced merged list of child and parent chromosome data structures is then considered and the next set of non-dominated solutions is identified and assigned a rank of 2. This process is iterated until all chromosome data structures of the merged list are assigned a domination rank for a particular subset. FIG. 6 illustrates a result of domination ranking applied to chromosome data structures based upon two objectives, $f_1$ (maximize) and $f_2$ (minimize), according to an example embodiment of the invention. As shown in FIG. 6, four chromosome data structures have a rank of "1"; two chromosome data structures have a rank of "2"; five chromosome data structures have a rank of "3"; and three chromosome data structures have a rank of "4". It will be appreciated that after the non-domination sorting, the same number of chromosome data structures are still members of the merged list; however, the list will have been "sorted" in the sense that chromosome data structures have been grouped into ranks which allow archive members to be identified (e.g., having a rank "1"), according to an example embodiment of the invention.

Figure 7:
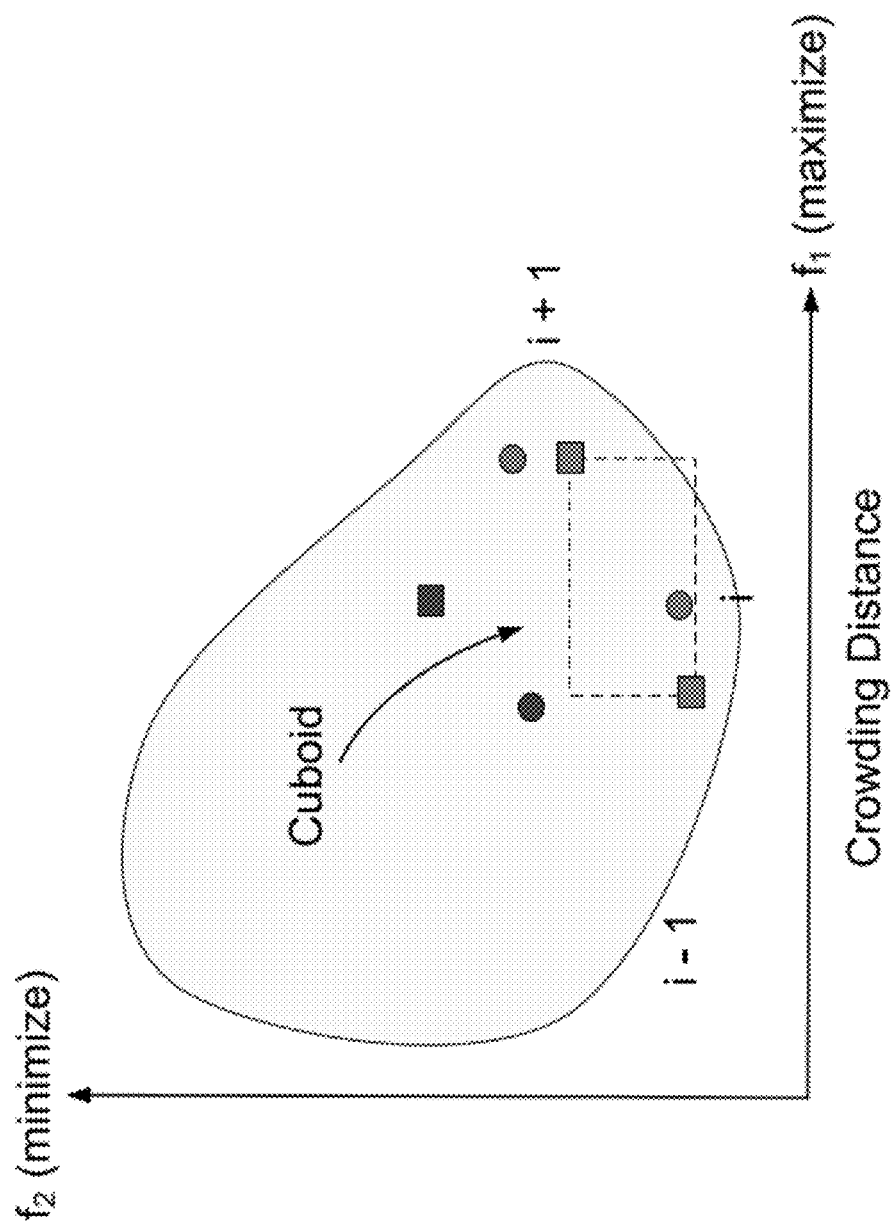
FIG. 7 illustrates an example diversity metric of a cuboid for an example chromosome data structure, according to an example embodiment of the invention.

In addition to determining a domination rank in block 556, the diversity metrics for the particular subset can also be calculated for each member of the merged list. In an example embodiment, the diversity metrics may be associated with crowding distance. For example, crowding distance may be defined as the largest distance or cuboid surrounding a solution in which no other solutions are present. FIG. 7 illustrates an example determination of a cuboid surrounding a solution, according to an example embodiment of the invention.

At block 558, the respective domination rank determined in block 556 for each chromosome data structure can then be recorded in the appropriate position (for the subset) in a rank array. An example rank array where 3 subsets are selected is illustrated below in Table III for respective chromosome data structures. For example, chromosome data structure #1 may have a rank array of [3,3,1] while chromosome data structure #2 may have a rank array of [1,4,6]. It will be appreciated that both of these chromosome data structures may be candidates for inclusion in the archive checkpoint 202 given their rank-1 in at least one element of their respective rank arrays, which helps to ensure "elitism" in the chromosome data structures stored in the archive checkpoint 202. However, these candidates will only be included in the archive checkpoint if they survive the epsilon non-domination sorting (e.g., thinning) process of block 610 described herein.

TABLE III

|  | Subset #1 Domination Rank | Subset #2 Domination Rank | Subset #3 Domination Rank |
|---|---|---|---|
| Chromosome Data Structure #1 | 3 | 3 | 1 |
| Chromosome Data Structure #2 | 1 | 4 | 6 |
| ... | ... | ... | ... |

Following block 558, processing may proceed to block 560. At block 560, the diversity metrics for each chromosome data structure can then be recorded in the appropriate position (for the subset) in a diversity array. An example diversity array where 3 subsets are utilized is illustrated below in Table IV for respective chromosome data structures. In Table IV, the diversity metrics may range from 0 to 1, where a smaller diversity metric may represent less diversity (e.g., smaller crowding distance) while a larger diversity metric may represent more diversity (e.g., larger crowding distance).

TABLE IV

|  | Subset #1 Diversity Metric | Subset #2 Diversity Metric | Subset #3 Diversity Metric |
|---|---|---|---|
| Chromosome Data Structure #1 | 0.145 | 0.787 | 0.324 |
| Chromosome Data Structure #2 | 0.256 | 0.143 | 0.897 |

It will be appreciated that while blocks 558 and 560 have been illustrated as separate blocks, they may also be combined into a single block without departing from example embodiments of the invention. Alternatively, block 560 may be performed before block 558, or blocks 558 and 560 may be performed in parallel, according to an example embodiment of the invention.

Following block 560, processing may proceed to block 562. Block 562 may determine whether the chromosome data structures have been evaluated in blocks 556, 558, and 560 with respect to all subsets in the plurality of declared sub-dimensional subsets. If any subsets remain, then processing may return to block 554 where another subset may be selected, followed by processing in blocks 556, 558, and 560. On the other hand, if no subsets in the plurality of declared sub-dimensional subsets remain, then processing may proceed to block 510 of FIG. 5A. It will be appreciated that in this situation, the rank arrays and diversity arrays may have determined values for each position corresponding to the respective subset.

Block 510 of FIG. 5A generally provides epsilon non-domination sorting (e.g., a thinning process) and archiving. An example process for block 510 will now be discussed in further detail with respect to FIG. 5C, but it will be appreciated that many variations of the process of FIG. 5C are available without departing from example embodiments of the invention.

Turning now to block 580, the non-domination sorted population of chromosome data structures from block 505 may be received along with the archive of chromosome data structures from archive checkpoint 202. At block 582, those chromosome data structures in the population which are rank-1 in at least one of the subsets (e.g., are non-dominated with respect to at least one subset), are combined with the archive of chromosome data structures to generate a merged population of chromosome data structures. The merged population may then represent the updated archive population in the archive checkpoint 202.

Following block 582 is block 584, where a subset from the plurality of declared sub-dimensional subsets is selected. At block 586, the archive population of chromosome data structures (based upon the merged population in block 582) may be thinned using epsilon non-domination sorting applied based upon the selected subset. A more detailed explanation of epsilon non-domination sorting will be discussed below with respect to FIGS. 8A-8F. However, in general terms, epsilon non-domination sorting for a particular subset may include plotting or mapping the solutions in the archive checkpoint 202 to a first epsilon value for objective function $f_1$ and a second epsilon value for objective function $f_2$, for example, if a subset is associated with the two functions, according to an example embodiment of the invention. The first epsilon value may be associated with a first epsilon spacing or step size $\epsilon_1$ associated with objective function $f_1$, and a second epsilon value may be associated with second epsilon spacing or step size $\epsilon_2$ associated with objective function $f_2$. Each solution may then be associated with an epsilon vector or epsilon box address ($\epsilon_1$, $\epsilon_2$) corresponding to the first epsilon value and the second epsilon value. If two or more solutions have the same epsilon box address, then the epsilon non-domination sorting may retain a single solution per epsilon box address ($\epsilon_1$, $\epsilon_2$). This solution may be determined based upon whether objective functions $f_1$ and $f_2$ are being minimized or maximized, according to an example embodiment of the invention. The solution that is retained may be referred to as the epsilon non-dominated solution, according to an example embodiment of the invention. It will be appreciated that while only two objective functions are described herein for a particular subset, other example embodiments may utilize more than two objective functions depending on the particular subsets without departing from example embodiments of the invention.

Accordingly, in block 588, the epsilon dominated solutions of the selected subset may be removed from the archive population in the archive checkpoint 202, thereby retaining the epsilon non-dominated solutions of the selected subset. Following block 588 is block 590, which may determine whether the chromosome data structures have been evaluated in blocks 586 and 588 with respect to all subsets of the plurality of declared sub-dimensional subsets. If any subsets remain, then processing may return to block 584, where another subset may be selected, followed by processing in blocks 586 and 588. On the other hand, if no subsets in the plurality of declared sub-dimensional subsets remain, then processing may proceed to block 219 of FIG. 2.

E. Job Termination Criteria

The termination criteria described in block 219 of FIG. 2 will now be described in further detail. In an example embodiment of the invention, the termination criteria may be based upon box fitness, as described herein.

As described above, the master processor 106 may have allocated a population of chromosome data structures to the slave processors 108 for evaluation. The slave processors 108 may evaluate the chromosome data structures according to at least two objective functions $f_1$ and $f_2$. Accordingly, each chromosome data structure may be associated with at least a respective first objective function value and a second objective function value corresponding to the objective functions $f_1$ and $f_2$.

Initially, a first non-domination sorting (e.g., block 505 of FIG. 5A) may be applied to the current population to remove solutions that are dominated, with respect to a particular subset, by at least one other solution (see, e.g., FIG. 5B, discussed below). It will be appreciated that a solution is non-dominated by another solution in a subset because it is strictly better in at least one objective function (determined by comparing the objective function values) and no worse than the eliminated solution with respect to the remaining objective functions (determined by comparing the objective function values).

Following the first non-domination sorting, epsilon non-domination sorting (e.g., block 510 of FIG. 5A) may be applied to the remaining solutions in the current population (see, e.g., FIG. 5C, discussed below). Epsilon non-domination sorting may include, for a particular subset, plotting or mapping the remaining solutions to a first epsilon value for objective function $f_1$ and a second epsilon value for objective function $f_2$, according to an example embodiment of the invention. The first epsilon value may be associated with a first epsilon spacing or step size $\epsilon_1$ associated with objective function $f_1$, and a second epsilon value may be associated with second epsilon spacing or step size $\epsilon_2$ associated with objective function $f_2$. Each solution may then be associated with an epsilon vector or epsilon box address ($\epsilon_1$, $\epsilon_2$) corresponding to the first epsilon value and the second epsilon value. If two or more solutions have the same epsilon box address for a particular subset, then the epsilon non-domination sorting may retain a single solution per epsilon box address ($\epsilon_1$, $\epsilon_2$). This solution may be determined based upon whether objective functions $f_1$ and $f_2$ are being minimized or maximized, according to an example embodiment of the invention. It will be appreciated that while only two objective functions are described herein, other example embodiments may utilize more than two objective functions without departing from example embodiments of the invention.

In an example embodiment of the invention, a box fitness termination criteria (e.g., block 219 of FIG. 2) may have two components. First, looking back over a predetermined number of previous generations/iterations for respective subsets, the total quantity of unique epsilon box addresses must remain unchanged above a predefined threshold (e.g., 90% or another user-defined percentage) for that particular subset. Second, the greater-than-or-equal-to threshold must be maintained for a predefined number of generations/iterations for respective subsets. If both of these components are met, then the job may be terminated. It will be appreciated that the first component discussed above may not be sufficient as the sole termination criteria because the box-fitness percentage change may oscillate above and below the predefined threshold (e.g., 90% or another user-defined percentage) for one or more subsets. If this occurs, then a counter utilized for the second component may be reset such that the evolutionary algorithm continues with additional generations/iterations until the box-fitness percentage change has held above the predefined threshold for the predefined number of sequential generations.

Figure 8A:
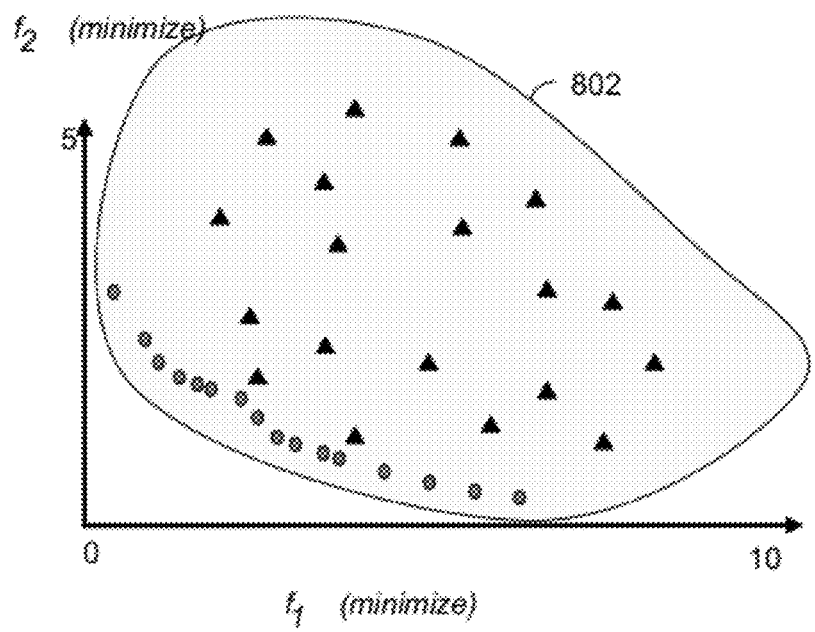
FIGS. 8A-8F illustrate a visual representation of an operation of box fitness termination criteria, according to an example embodiment of the invention.

An example box fitness termination criteria for an example subset will be graphically illustrated with respect to FIGS. 8A-8F. FIG. 8A illustrates a feasible design region 802 associated with a first objective function $f_1$ and a second objective function $f_2$. Within the feasible design region is a snapshot of a population of solutions (e.g., at block 216) of a given generation/iteration, according to an example embodiment of the invention. Based upon the goal of minimizing the first and second objective functions $f_1$ and $f_2$, non-domination sorting (e.g., at block 505) identifies all of the circles as being non-dominated solutions and all of the triangles as dominated solutions. The dominated solutions may be eliminated from the population or removed from further consideration, according to an example embodiment of the invention.

Figure 8B:
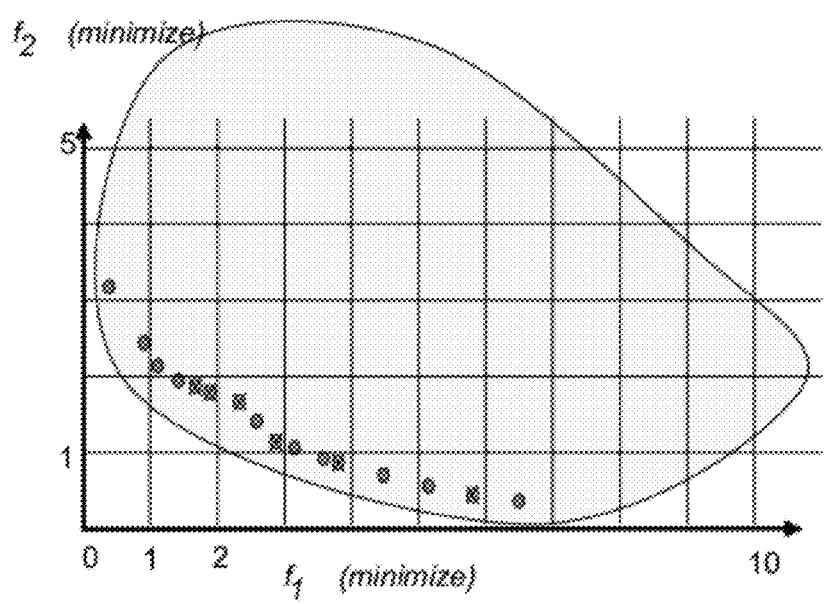

In FIG. 8B, epsilon non-domination sorting (e.g., at block 510) may be applied to the remaining solutions (e.g., non-eliminated solutions) from the first non-domination sorting of FIG. 8A. An epsilon spacing or step size can be defined for objective functions $f_1$ and $f_2$ to generate an epsilon grid in the objective space, where following epsilon non-domination sorting, only one solution exists in each block/box of the grid defined by an epsilon box address. In FIG. 8B, the epsilon non-dominated solutions for a particular subset are illustrated by circles, while the epsilon dominated (inferior) solutions are illustrated by the crossed-out circles. Because both objective functions $f_1$ and $f_2$ are being minimized in this example, the solution closest to the lower left corner of each block/box (as measured by distance) is kept as the epsilon non-dominated solution. It will be appreciated that in alternate embodiments, that one or both of objective functions $f_1$ and $f_2$ could also be maximized as well without departing from example embodiments of the invention.

Figure 8C:
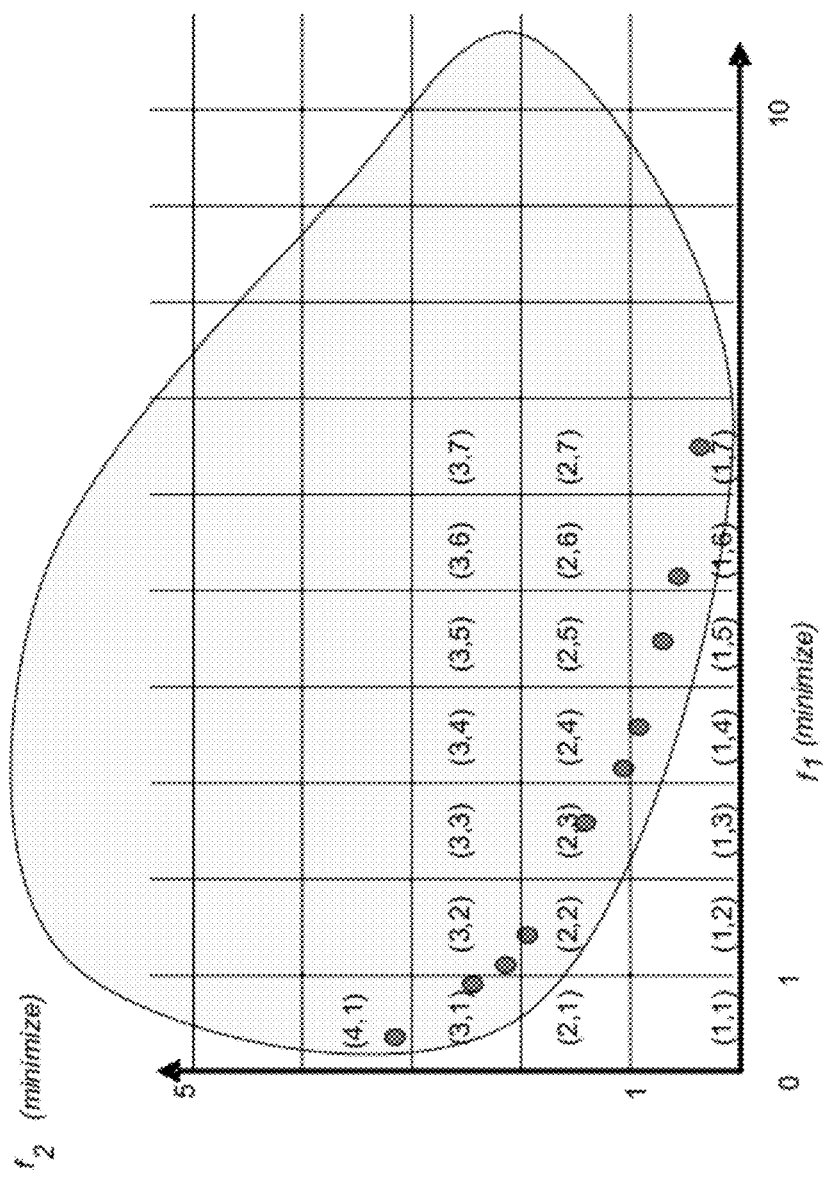

In FIG. 8C, the epsilon non-dominated solutions for a particular subset are illustrated. Each of these solutions has an epsilon box address as shown by FIG. 8C. Each solution inside a given box has a fitness based upon its domination rank and diversity, as described herein in accordance with an example embodiment of the invention. Because only one solution can exist in any given box for a particular subset during a generation/iteration (e.g., box 221), one can count how many boxes remain unchanged from iteration to iteration.

Figure 8D:
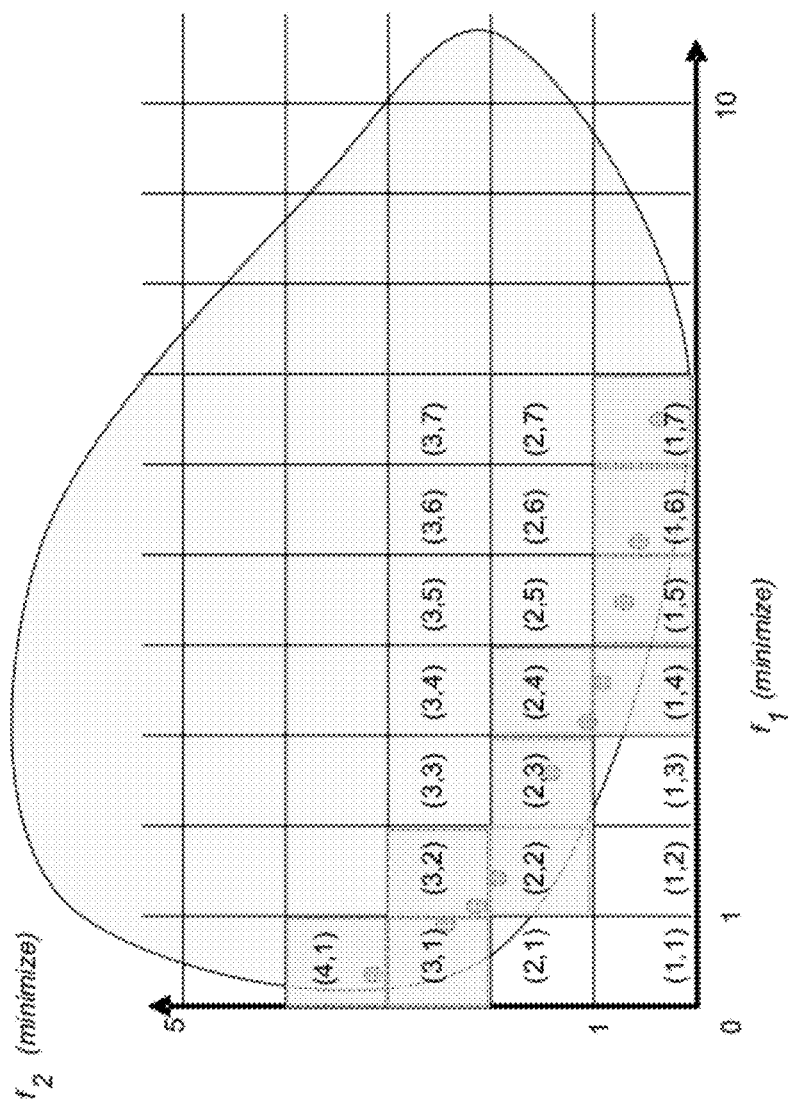

In FIG. 8D, the number of unique boxes for a particular subset of a particular generation/iteration (e.g., box 221 or 621) is illustrated. In particular, in FIG. 8D, there are 10 unique boxes corresponding to the addresses of: (4,1), (3,1), (3,2), (2,2), (2,3), (2,4), (1,4), (1,5), (1,6), and (1,7). The addresses for each unique box may be stored in a memory or archive for the purposes of comparison to future generations.

Figure 8E:
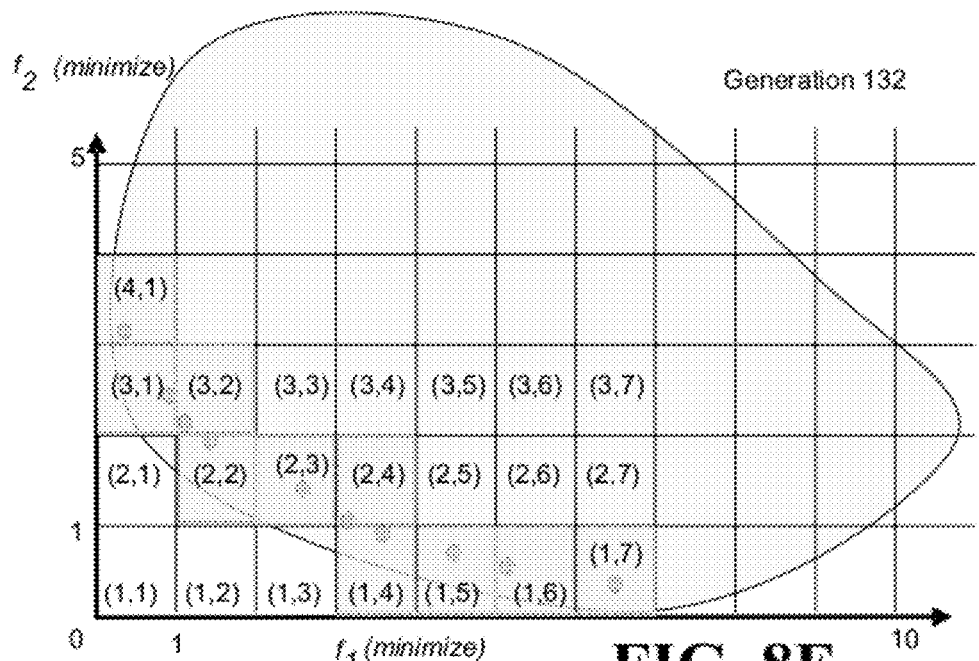
Figure 8F:
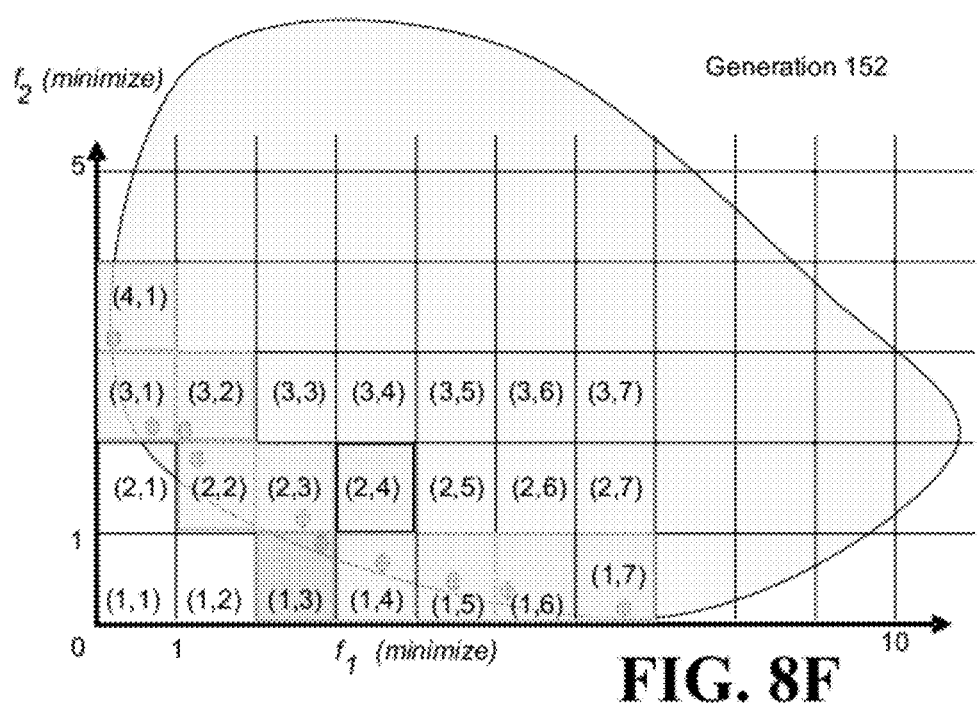

FIG. 8E illustrates a snapshot of a mostly converged population of epsilon non-dominated solutions for a particular subset at a particular generation/iteration such as generation #132. FIG. 8F illustrates a snapshot of the population of non-dominated solutions for a particular subset at a subsequent generation/iteration such as generation #152. As compared to FIG. 8E, one of the solutions in FIG. 8F has moved closer to the Pareto-optimal front, but the remaining solutions have not materially improved with regard to their box addresses for a particular subset. Note one new epsilon box address of (1,3) has been found in FIG. 8F as compared to FIG. 8E. However, this represents a 90% unchanged population between FIGS. 8E and 8F with respect to unique box addresses, which has remained above this threshold for the predetermined number of consecutive generations/iterations (e.g., last 20 consecutive generations/iterations), so there is a potential for termination of this job, if the foregoing criteria is met when applied to all subsets of the plurality of declared subsets.

It will be appreciated that while the box fitness criteria have been illustrated with respect to two objective functions, the box fitness can be applied where there are three or more objective functions without departing from example embodiments of the invention. Indeed, the box-fitness termination criteria can be generalized to n-objectives/dimensions, where 3 objectives/dimensions may be represented by volumes, and 4+ objectives/dimensions can be represented by hypervolumes.

In addition, it will be appreciated that the epsilon spacings or step sizes discussed herein may be varied in accordance with an example embodiment of the invention. For example, a larger epsilon spacing or step size may decrease the number of generations/iterations that are needed before the box-fitness termination criteria are met and a job is terminated. On the other hand, a smaller epsilon spacing or step size may increase the number of generations/iterations that are needed before the box-fitness termination criteria are met and the job is terminated.

Figure 9:
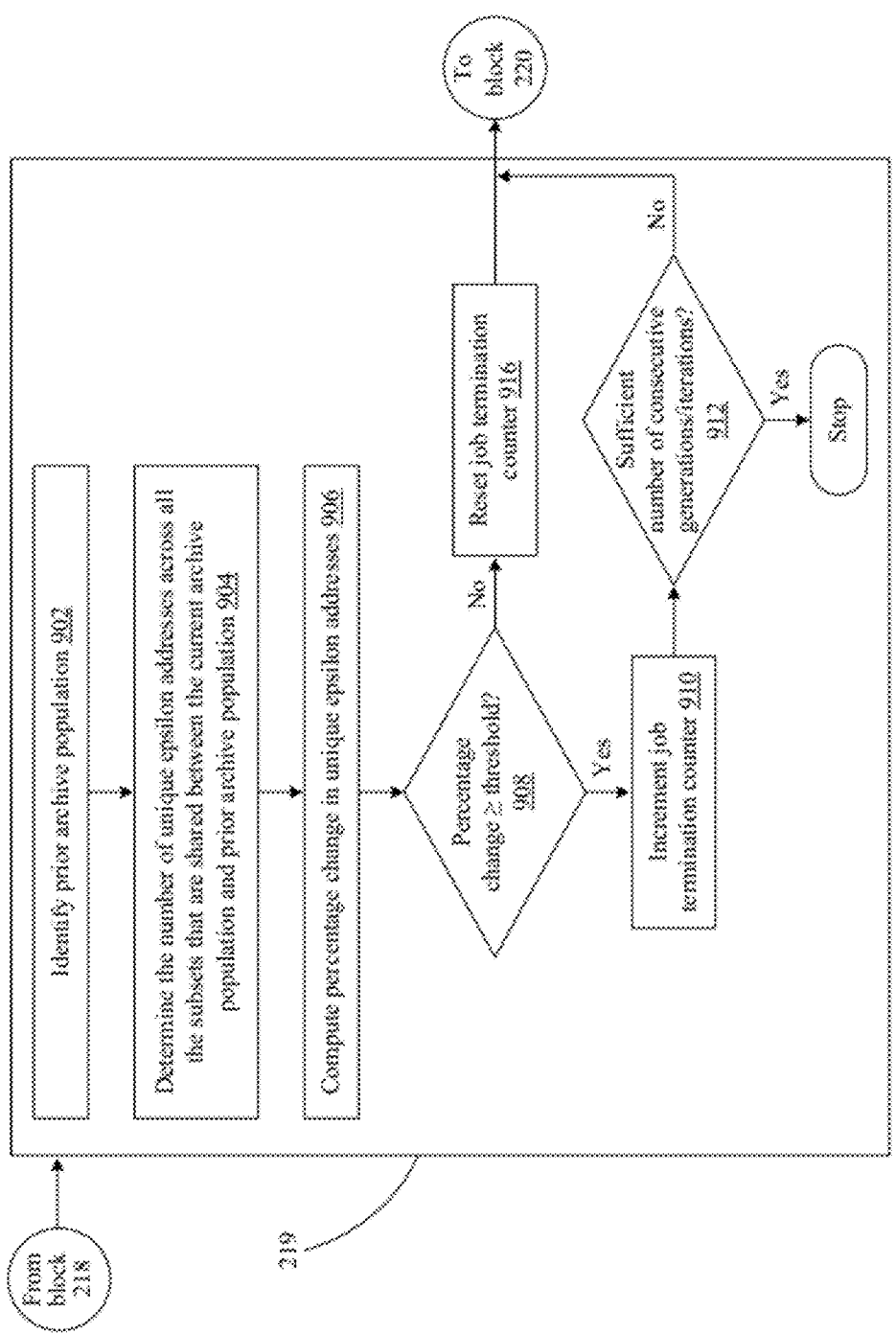
FIG. 9 illustrates an example process for determining job termination, according to an example embodiment of the invention.

FIG. 9 illustrates an example implementation for the job termination criteria of block 219 of FIG. 2. At block 902, a prior archive population of chromosome data structures for a prior generation/iteration may be identified. For example, the prior archive population may be 20 generations/iterations back from a current generation/iteration, according to an example embodiment of the invention. At block 904, the current archive population resulting from block 218 of FIG. 2 may then be compared to the prior archive population identified in block 902 on a subset-by-subset basis to determine the number of unique epsilon addresses across all the subsets that are shared between the current archive population and prior archive population. Following block 904, processing may proceed to block 906.

Block 906 may then compute a box fitness calculation to determine the percentage change in unique epsilon addresses. Generally, this box fitness calculation may account for differences resulting from changes in sizes of the archive populations across different generations or iterations. In an example embodiment of the invention, this box fitness calculation may be provided as follows, where num_Matched represents the Number of Matching Epsilon Addresses across generations:

$$Box\_Fitness=100*(num\_Matched)/((size\ of\ current\ archive\ population+size\ of\ prior\ archive\ population-num\_Matched)$$

Following block 906, processing may proceed to block 908. Block 908 determines whether the percentage change in unique epsilon addresses has remained unchanged above a predefined threshold (e.g., 90% or another user-defined percentage) for the plurality of declared subsets between the current and prior generations/iterations. If the criteria of block 906 are not met, then a job termination counter can be reset because the job may not be terminated until the criteria of block 906 are met for a consecutive number of generations/iterations. On the other hand, if the criteria of block 906 are met, then the job termination counter can be incremented in block 910. Following block 910, processing may proceed to block 912. Block 912 may determine whether the percentage change in unique epsilon addresses has remained the same for a predefined number of generations/iterations. To do so, block 912 may compare the job termination counter to a threshold corresponding to the predefined number of generations/iterations. If the criteria of block 912 are met, then the job is terminated. Otherwise, processing continues with block 220 of FIG. 2, as discussed herein.

The invention is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general purpose computer, a special-purpose computer, a processor, or other programmable data processing apparatus to produce a particular machine, such that the instructions that execute on the computer, processor, or other programmable data processing apparatus create means for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other embodiments, the databases shown can be integrated or distributed into any number of databases or other data storage devices.

Many modifications and other embodiments of the invention set forth herein will be apparent having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method comprising:
   determining a plurality of sub-dimensional subsets, wherein the plurality of sub-dimensional subsets collectively define a restricted search space for an unbiased optimization of a plurality of variables in accordance with a plurality of objectives, wherein the restricted search space is only a portion of a total search space defined from the plurality of objectives;
   receiving a pair of chromosome data structures, wherein each of the pair of chromosome data structures provides a plurality of genes representative of the plurality of variables, wherein each of the plurality of variables are permitted to evolve in value; for each subset of the plurality of sub-dimensional subsets, the method further includes:
   selecting the respective subset for competition;
   determining a subset-winning chromosome data structure from the pair of chromosome data structures by considering at least one of (i) respective domination characteristics for respective ones of the pair of chromosome data structures based upon a competition between the pair of chromosome data structures, or (ii) respective diversity characteristics associated with respective ones of the pair of chromosome data structures;
   incrementing a unit of measure for the subset-winning chromosome data structure, wherein an amount accumulated for the unit of measure varies depending upon a respective subset ranking previously assigned to the subset-winning chromosome data structure, the respective subset ranking determined by performing domination sorting, restricted to the selected respective subset, for an entire population of chromosome data structures that included the subset-winning chromosome data structure; and
   determining an overall winning chromosome data structure of the pair of chromosome data structures by at least comparing a respective accumulated unit of measure for each of the pair of chromosome data structures,
   wherein the prior steps are performed by one or more computers.

2. The method of claim 1, wherein the competition determines whether one of the pair of the chromosome data structures is dominated by the other one of the pair of chromosome data structures, wherein the competition is limited to the selected subset.

3. The method of claim 2, wherein:
   if one of the chromosome data structures in the pair is dominated by the other one in the pair, then the subset-winning chromosome data structure is the non-dominated one of the chromosome data structures in the pair.

4. The method of claim 2, wherein if none of the chromosome data structures in the pair is dominating, then utilizing the respective diversity characteristics to determine whether one of the chromosome data structures is more diverse, and if so, the subset-winning chromosome data structure is the more diverse one of the chromosome data structures in the pair, and if not, the subset-winning chromosome data structure is a randomly selected one of the chromosome data structures in the pair.

5. The method of claim 4, wherein the diversity characteristics are associated with crowding distance or spread.

6. The method of claim 1, wherein the unit of measure comprises points, wherein a scoring system assigns a respective amount of points based upon the respective subset ranking previously assigned to the subset-winning chromosome data structure, the scoring system assigning points in a non-linear manner.

7. The method of claim 1, wherein the pair of chromosome data structures is received from a parent population of chromosome data structures, wherein each chromosome data structure in the parent population is either (i) randomly generated, or (ii) obtained from another population of chromosome data structures that are epsilon non-dominated for at least one subset in a restricted portion of the plurality of sub-dimensional subsets.

8. The method of claim 7, further comprising:
   processing, via one or more evolutionary operators, the overall winning chromosome data structure to generate one or more child chromosome data structures that is included as part of a merged population that further includes at least a portion of the parent population; and
   assigning, for each chromosome data structure in the merged population, a respective domination rank associated with each subset of the plurality of sub-dimensional subsets, each respective domination rank indicating an extent to which a particular chromosome data structure is non-dominated with respect to other chromosome data structures in the merged population with respect to the sub-dimensional subset associated with the respective domination rank.

9. The method of claim 8, further comprising:
   determining a set of non-dominated chromosome data structures from the merged population, wherein each chromosome data structure in the set is non-dominated with respect to any other chromosome data structure in the merged population for at least one subset in accordance with the respective domination rank; and
   applying epsilon non-domination sorting to the set of non-dominated chromosome data structures, wherein epsilon non-domination sorting comprises, for each subset:
   determining one or more epsilon spacing values,
   assigning an epsilon address for each chromosome data structure in the set, wherein each epsilon address is based at least in part on the one or more epsilon spacing values; and
   where two or more chromosome data structures are assigned a same epsilon address for a respective subset, retaining only one chromosome data structure of the two or more chromosome data structures having the same epsilon address.

10. The method of claim 1, wherein the plurality of sub-dimensional subsets are determined as a portion of a total number of subsets defined from the plurality of objectives.

11. A system, comprising:
    at least one memory that stores computer-executable instructions;

at least one processor configured to access the memory, wherein the at least one processor is further configured to execute the computer-executable instructions to:

determine a plurality of sub-dimensional subsets, wherein the plurality of sub-dimensional subsets collectively define a restricted search space for an unbiased optimization of a plurality of variables in accordance with a plurality of objectives, wherein the restricted search space is only a portion of a total search space defined from the plurality of objectives;

receive a pair of chromosome data structures, wherein each of the pair of chromosome data structures provides a plurality of genes representative of the plurality of variables, wherein each of the plurality of variables are permitted to evolve in value;

for each subset of the plurality of sub-dimensional subsets: select the respective subset for competition; determine a subset-winning chromosome data structure from the pair of chromosome data structures by considering at least one of (i) respective domination characteristics for respective ones of the pair of chromosome data structures based upon a competition between the pair of chromosome data structures, or (ii) respective diversity characteristics associated with respective ones of the pair of chromosome data structures; increment a unit of measure for the subset-winning chromosome data structure, wherein an amount accumulated for the unit of measure varies depending upon a respective subset ranking previously assigned to the subset-winning chromosome data structure, the respective subset ranking determined by performing domination sorting, restricted to the selected subset, for an entire population of chromosome data structures that included the subset-winning chromosome data structure; and determine an overall winning chromosome data structure of the pair of chromosome data structures by at least comparing a respective accumulated unit of measure for each of the pair of chromosome data structures.

12. The system of claim 11, wherein the competition determines whether one of the pair of the chromosome data structures is dominated by the other one of the pair of chromosome data structures, wherein the competition is limited to the selected subset.

13. The system of claim 12, wherein:
if one of the chromosome data structures in the pair is dominated by the other one in the pair, then the subset-winning chromosome data structure is the non-dominated one of the chromosome data structures in the pair.

14. The system of claim 12, wherein if none of the chromosome data structures in the pair is dominating, then utilizing the respective diversity characteristics to determine whether one of the chromosome data structures is more diverse, and if so, the winning chromosome data structure is the more diverse one of the chromosome data structures in the pair, and if not, the subset-winning chromosome data structure is a randomly selected one of the chromosome data structures in the pair.

15. The system of claim 14, wherein the diversity characteristics are associated with crowding distance or spread.

16. The system of claim 11, wherein the unit of measure comprises points, wherein a scoring system assigns a respective amount of points based upon the respective subset ranking previously assigned to the subset-winning chromosome data structure, the scoring system assigning points in a non-linear manner.

17. The system of claim 11, wherein the pair of chromosome data structures is received from a parent population of chromosome data structures, wherein each chromosome data structure in the parent population is either (i) randomly generated, or (ii) obtained from another population of chromosome data structures that are epsilon non-dominated for at least one subset in a restricted portion of the plurality of sub-dimensional subsets.

18. The system of claim 17, wherein the at least one processor is further configured to execute the computer-executable instructions to:

process, via one or more evolutionary operators, the overall winning chromosome data structure to generate one or more child chromosome data structures that is included as part of a merged population that further includes at least a portion of the parent population; and assign, for each chromosome data structure in the merged population, a respective domination rank associated with each subset of the plurality of sub-dimensional subsets, each respective domination rank indicating an extent to which a particular chromosome data structure is non-dominated with respect to other chromosome data structures in the merged population with respect to the sub-dimensional subset associated with the respective domination rank.

19. The system of claim 18, wherein the at least one processor is further configured to execute the computer-executable instructions to:

determine a set of non-dominated chromosome data structures from the merged population, wherein each chromosome data structure in the set is non-dominated with respect to any other chromosome data structure in the merged population for at least one subset in accordance with the respective domination rank; and apply epsilon non-domination sorting to the set of non-dominated chromosome data structures, wherein epsilon non-domination sorting comprises, for each subset:

determining one or more epsilon spacing values, assigning an epsilon address for each chromosome data structure in the set, wherein each epsilon address is based at least in part on the one or more epsilon spacing values; and where two or more chromosome data structures are assigned a same epsilon address for a respective subset, retaining only one chromosome data structure of the two or more chromosome data structures having the same epsilon address.

20. The system of claim 19, wherein subsequent to the epsilon non-domination sorting, the determined set of non-dominated chromosome data structures is included within a current archive population of chromosome data structures, wherein the current archive population is compared to a prior archive population to determine, for each subset, a change in a number of unique epsilon addresses associated with the respective chromosome data structures in each archive population, the prior archive population generated from a prior iteration of a job, wherein the change in the number of unique epsilon addresses for each subset is a factor in determining whether to terminate the job.

* * * * *